United States Patent
Kinoshita et al.

(10) Patent No.: US 12,247,499 B2
(45) Date of Patent: Mar. 11, 2025

(54) TRANSITION PIECE, COMBUSTOR, GAS TURBINE, AND GAS TURBINE EQUIPMENT

(71) Applicant: Mitsubishi Power, Ltd., Kanagawa (JP)

(72) Inventors: Taiki Kinoshita, Yokohama (JP); Sosuke Nakamura, Yokohama (JP); Kotaro Miyauchi, Yokohama (JP); Kenji Sato, Yokohama (JP); Kenta Taniguchi, Yokohama (JP); Satoshi Mizukami, Yokohama (JP); Yoshinori Wakita, Tokyo (JP); Shinji Akamatsu, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 142 days.

(21) Appl. No.: 17/612,400

(22) PCT Filed: Mar. 5, 2020

(86) PCT No.: PCT/JP2020/009303
§ 371 (c)(1),
(2) Date: Nov. 18, 2021

(87) PCT Pub. No.: WO2020/240970
PCT Pub. Date: Dec. 3, 2020

(65) Prior Publication Data
US 2022/0228530 A1 Jul. 21, 2022

(30) Foreign Application Priority Data
May 24, 2019 (JP) .................................. 2019-097550

(51) Int. Cl.
F01D 9/02 (2006.01)
F02C 7/18 (2006.01)

(52) U.S. Cl.
CPC .............. *F01D 9/023* (2013.01); *F02C 7/185* (2013.01); *F05D 2260/963* (2013.01); *F23R 2900/00014* (2013.01)

(58) Field of Classification Search
CPC ........................... F01D 9/023; F05D 2260/963
See application file for complete search history.

(56) References Cited

U.S. PATENT DOCUMENTS

2013/0074502 A1* 3/2013 Hada ....................... F23R 3/005
60/722
2013/0098063 A1 4/2013 Mizukami et al.
(Continued)

FOREIGN PATENT DOCUMENTS

CN 1705815 12/2005
CN 102971510 3/2013
(Continued)

OTHER PUBLICATIONS

International Search Report issued May 26, 2020 in corresponding International Application No. PCT/JP2020/009303.
(Continued)

*Primary Examiner* — Todd E Manahan
*Assistant Examiner* — Alyson Joan Harrington
(74) *Attorney, Agent, or Firm* — Wenderoth, Lind & Ponack, L.L.P.

(57) ABSTRACT

A tail pipe (50) comprises: a pipe (51); an acoustic attenuator (61) that forms an acoustic space (Ss) on the outer peripheral side of the pipe (51); and a cooling air jacket (65) that forms a cooling air space (Sa) isolated from the outer space (So), which is the space on the outer peripheral side of the pipe (51). The pipe (51) has: a first air flow path (56) that is formed between the outer peripheral surface (55o) and the inner peripheral surface (55i); and an acoustic hole (59) that penetrates from the acoustic space (Ss) to a combustion (Continued)

space (Sc), which is a space on the inner peripheral side of the pipe (51*c*). The first air flow path (56) has: an inlet (56*i*) that faces into the cooling air space (Sa) and guides the air in the cooling air space (Sa) into the first air flow path (56); and an outlet (56*o*) that faces into the acoustic space (Ss) and guides the air passing through the first air flow path (56) into the acoustic space (Ss).

7 Claims, 14 Drawing Sheets

(56) References Cited

U.S. PATENT DOCUMENTS

| | | |
|---|---|---|
| 2017/0108221 A1 | 4/2017 | Mizukami et al. |
| 2017/0138201 A1 | 5/2017 | Takata |
| 2017/0254267 A1 | 9/2017 | Mizukami et al. |
| 2019/0107053 A1 | 4/2019 | Miyamoto et al. |

FOREIGN PATENT DOCUMENTS

| | | |
|---|---|---|
| CN | 106211787 | 12/2016 |
| CN | 107076027 | 8/2017 |
| CN | 108884762 | 11/2018 |
| EP | 1 001 224 | 5/2000 |
| EP | 1568869 | 8/2005 |
| JP | 2000-171038 | 6/2000 |
| JP | 2008-274774 | 11/2008 |
| JP | 2012-77660 | 4/2012 |
| JP | 5653705 | 1/2015 |
| JP | 2015-222022 | 12/2015 |
| JP | 2016-108964 | 6/2016 |
| JP | 6175193 | 8/2017 |

OTHER PUBLICATIONS

Written Opinion of the International Searching Authority issued May 26, 2020 in corresponding International Application No. PCT/JP2020/009303, with English-language translation.

* cited by examiner

TRANSITION PIECE, COMBUSTOR, GAS TURBINE, AND GAS TURBINE EQUIPMENT

TECHNICAL FIELD

The present invention relates to a transition piece including a pipe in which fuel is combusted on an inner peripheral side, a combustor including the transition piece, a gas turbine, and gas turbine equipment.

Priority is claimed on Japanese Patent Application No. 2019-097550, filed May 24, 2019, the content of which is incorporated herein by reference.

BACKGROUND ART

A gas turbine includes a compressor that compresses air to generate compressed air; a combustor that combusts fuel in the compressed air; a turbine that is driven by combustion gas generated by the combustion of the fuel; and an intermediate casing. The compressor includes a compressor rotor and a compressor casing that covers the compressor rotor. The combustor includes a transition piece (or a combustion pipe) in which fuel is combusted on an inner peripheral side, and a burner that injects the fuel into the transition piece. The turbine includes a turbine rotor and a turbine casing that covers the turbine rotor. The compressor casing and the turbine casing are connected to each other via the intermediate casing. The compressed air that has been discharged from the compressor flows into the intermediate casing. The combustor is provided in the intermediate casing.

The following PTL 1 discloses a transition piece of a combustor. The transition piece includes a pipe in which fuel is combusted on an inner peripheral side; an acoustic damper forming an acoustic space on an outer peripheral side of the pipe; and a cooling air jacket forming a cooling air space on the outer peripheral side of the pipe. The acoustic damper is provided in an upstream portion of the pipe. The cooling air jacket is provided in a downstream portion of the pipe. Most of the compressed air in the intermediate casing flows into the combustor. In addition, some of the compressed air in the intermediate casing is bled out of the intermediate casing. The compressed air that has been bled is boosted by a boost compressor, and then flows into the cooling air space as enhanced cooling air. A cooling air flow path A and a cooling air flow path B are formed between an outer peripheral surface and an inner peripheral surface of the pipe. An acoustic hole penetrating through the pipe from the outer peripheral surface to the inner peripheral surface is formed in a portion of a panel forming the pipe, the acoustic damper being formed in the portion.

The cooling air flow path A includes an inlet that is open in a portion of the outer peripheral surface of the pipe, the cooling air jacket being formed in the portion, and an outlet that is open in a portion of the outer peripheral surface of the pipe, the acoustic damper and the cooling air jacket not being provided in the portion. The enhanced cooling air in the cooling air space flows into the cooling air flow path A. The enhanced cooling air exchanges heat with the pipe, which is exposed to the combustion gas, to cool the pipe in the process of passing through the cooling air flow path A. After the enhanced cooling air has exchanged heat with the pipe, the enhanced cooling air flows out into the intermediate casing from the outlet of the cooling air flow path A.

The cooling air flow path B includes an inlet that is open in a portion of the outer peripheral surface of the pipe, the acoustic damper and the cooling air jacket not being provided in the portion, and an outlet that is open in a portion of the outer peripheral surface of the pipe, the acoustic damper being provided in the portion. The compressed air present in the intermediate casing that is a space on the outer peripheral side of the pipe flows into the cooling air flow path B. The compressed air exchanges heat with the pipe, which is exposed to the combustion gas, to cool the pipe in the process of passing through the cooling air flow path B. After the compressed air has flowed into the acoustic space, the compressed air flows out to a space on the inner peripheral side of the pipe from the acoustic hole. The compressed air flows out from the acoustic space to the space on the inner peripheral side of the pipe through the acoustic hole such that the high-temperature combustion gas generated in the space on the inner peripheral side of the pipe does not flow into the acoustic space through the acoustic hole.

CITATION LIST

Patent Literature

[PTL 1] Japanese Unexamined Patent Application Publication No. 2012-077660

SUMMARY OF INVENTION

Technical Problem

It is preferable that the mass flow rate of the air flowing out from the acoustic space to the space on the inner peripheral side of the pipe is small from the viewpoint of suppressing the amount of NOx generated. In addition, since the air flowing out from the acoustic space to the space on the inner peripheral side of the pipe lowers the temperature of the combustion gas, which is generated in the space on the inner peripheral side of the pipe, to reduce the efficiency of the gas turbine, it is preferable that the mass flow rate of the air is small.

Therefore, an object of the present invention is to provide a technique by which, while the air is allowed to flow out from an acoustic space to a space on an inner peripheral side of a pipe, the mass flow rate of the air can be suppressed.

Solution to Problem

According to one aspect of the invention to achieve the above object, there is provided a transition piece including: a pipe which has a tubular shape around an axis, and in which fuel is combusted on an inner peripheral side of the pipe; an acoustic damper including a part of a panel forming the pipe, and an acoustic cover forming an acoustic space on an outer peripheral side of the pipe in conjunction with the part of the panel; and a cooling air jacket forming a cooling air space in conjunction with another part of the panel forming the pipe except for a portion forming the acoustic damper, the cooling air space being isolated from an outer space that is a space on the outer peripheral side of the pipe. The pipe includes an inlet opening formed at an end on an upstream side that is one side in an axial direction in which the axis extends, an outlet opening formed at an end on a downstream side that is the other side in the axial direction, an outer peripheral surface facing the outer peripheral side, an inner peripheral surface facing the inner peripheral side, a first air flow path formed between the outer peripheral surface and the inner peripheral surface, and an acoustic hole penetrating through the pipe from the acoustic space to a combustion space that is a space on the inner peripheral side of the pipe. The first air flow path includes an inlet facing the cooling air space and guiding air in the cooling air space into the first air flow path, and an outlet facing the acoustic space and guiding the air, which has passed through the first air flow path, into the acoustic space.

In this aspect, the air in the cooling air space flows into the first air flow path to flow through the first air flow path. The air is heated while cooling the pipe because of heat exchange with the pipe, which is exposed to combustion gas, in the process of flowing through the first air flow path. The air that has passed through the first air flow path flows from the outlet of the first air flow path into the acoustic space. The air that has flowed into the acoustic space flows out to the combustion space from the acoustic hole. For this reason, the combustion gas in the combustion space does not flow into the acoustic space.

In order to ensure that the combustion gas in the combustion space does not flow into the acoustic space, a pressure Ps in the acoustic space needs to be higher than a pressure Pc in the combustion space, and a pressure difference ΔP between both pressures (=Ps−Pc>0) needs to be a certain value or more.

The pressure difference ΔP is proportional to a density ρ of a fluid and is proportional to the square of a flow velocity v of the fluid as expressed by the following equation.

$$\Delta P \propto \rho \cdot v^2$$

As can be understood from the above equation, when the pressure difference ΔP is to be set to the certain value or more, increasing the flow velocity v of the fluid is more effective than increasing the density ρ of the fluid. In addition, the flow velocity v of the fluid is increased by increasing the volume of the fluid while reducing the density ρ of the fluid, so that the mass flow rate of the fluid flowing out from the acoustic space to the combustion space can be suppressed. As a method for increasing the volume of the fluid while reducing the density ρ of the fluid, there is a method in which the fluid is expanded by increasing the amount of heating of the fluid.

Here, in order to facilitate understanding of the following description, a comparative example of this aspect will be described. A pipe of the comparative example does not include the first air flow path of this aspect, but includes a second air flow path. The second air flow path is formed between the outer peripheral surface and the inner peripheral surface of the pipe. The second air flow path includes an inlet that faces the outer space and that guides the air in the outer space into the second air flow path, and an outlet that faces the acoustic space and that guides the air, which has passed through the second air flow path, into the acoustic space. The air in the outer space flows into the second air flow path from the inlet of the second air flow path to flow through the second air flow path. The air is heated while cooling the pipe because of heat exchange with the pipe, which is exposed to the combustion gas, in the process of flowing through the second air flow path. The air that has passed through the second air flow path flows from the outlet of the second air flow path into the acoustic space. The air that has flowed into the acoustic space flows out to the combustion space from the acoustic hole.

In the comparative example, when the air in the outer space has a constant pressure and a constant temperature, as a method for increasing the amount of heating of the air flowing through the second air flow path, for example, there is a method for lengthening the flow path length of the second air flow path. In this method, the following problems occur.

(1) There is a possibility that the pressure loss in the second air flow path increases, so that the air in the outer space does not reach the acoustic space, or does not flow out to the combustion space from the acoustic hole.

(2) There is a possibility that the temperature of the air becomes very high by the time the air reaches the acoustic space, so that the air has no capability to cool the pipe.

In addition, there is also another method for forming the second air flow path in a region of the pipe which is easily heated by the combustion gas. Even in this method, the above problem (2) occurs.

In this aspect, the air in the cooling air space isolated from the outer space flows through the first air flow path. Therefore, in this aspect, the air having a pressure and a temperature different from those of the air in the outer space is capable of flowing through the first air flow path. For this reason, in this aspect, since the air having a higher pressure and a lower temperature than those of the air in the outer space is supplied to the cooling air space, as the method for increasing the amount of heating of the air, even when the method for lengthening the flow path length of the first air flow path and/or the method for forming the first air flow path in a region of the pipe which is easily heated by the combustion gas are adopted, the above problems (1) and (2) do not occur.

Therefore, in this aspect, the pressure difference ΔP (=Ps−Pc) between the pressure Ps in the acoustic space and the pressure Pc in the combustion space Sc is set to the certain value or more, so that while the air is allowed to flow out from the acoustic space to the combustion space on the inner peripheral side of the pipe, the mass flow rate of the air can be suppressed.

Here, in the transition piece according to this aspect, the cooling air jacket may be located on the downstream side of the acoustic cover.

In the combustion space, the temperature on the downstream side from a tip portion of a flame formed by the combustion of the fuel is higher than the temperature on the upstream side from the tip portion of the flame. Therefore, a region on the downstream side of the pipe is more easily heated by the combustion gas than a region on the upstream side. For this reason, in this aspect, the first air flow path is formed in the region on the downstream side of the pipe which is easily heated, so that the amount of heating of the air flowing through the first air flow path is increased.

The transition piece according to this aspect in which the cooling air jacket is located on the downstream side of the acoustic cover may include an attachment flange extending from the outer peripheral surface of the pipe to the outer peripheral side at the end on the downstream side of the pipe. In this case, the cooling air jacket is in contact with the attachment flange.

In addition, in the transition piece according to one of the above aspects, the pipe may include a second air flow path formed between the outer peripheral surface and the inner peripheral surface. In this case, the second air flow path includes an inlet facing the outer space and guiding air in the outer space into the second air flow path, and an outlet facing the acoustic space and guiding the air, which has passed through the second air flow path, into the acoustic space.

In this aspect, a portion of the pipe which cannot be cooled by the air flowing through the first air flow path can be cooled by the air flowing through the second air flow path.

In addition, the transition piece according to one of the above aspects may include a plurality of the acoustic covers.

In this case, the outlet of the first air flow path faces the acoustic space formed by at least one acoustic cover of the plurality of acoustic covers.

In the transition piece according to this aspect which includes the plurality of acoustic covers, the pipe may include a second air flow path formed between the outer peripheral surface and the inner peripheral surface. In this case, the second air flow path includes an inlet facing the outer space and guiding air in the outer space into the second air flow path, and an outlet facing the acoustic space formed by at least the one acoustic cover of the plurality of acoustic covers, and guiding the air, which has passed through the second air flow path, into the acoustic space.

In this aspect, a portion of the pipe which cannot be cooled by the air flowing through the first air flow path can be cooled by the air flowing through the second air flow path.

In the transition piece according to this aspect which includes the plurality of acoustic covers and the second air flow path, the pipe may include the first air flow path and the second air flow path, which communicate with the acoustic space formed by each of the acoustic covers, for each of the plurality of acoustic covers.

In the transition piece according to one of the above aspects which includes the second air flow path, the inlet of the second air flow path may be located on the upstream side of the acoustic cover.

In this aspect, a portion on the upstream side of the pipe with respect to the acoustic cover can be cooled by the air flowing through the second air flow path.

In the transition piece according to one of the above aspects, the pipe may include a third air flow path formed between the outer peripheral surface and the inner peripheral surface. In this case, the third air flow path includes an inlet facing the cooling air space and guiding the air in the cooling air space into the third air flow path, and an outlet facing the outer space and guiding the air, which has passed through the third air flow path, into the outer space.

In this aspect, a portion of the pipe which cannot be cooled by the air flowing through the first air flow path can be cooled by the air flowing through the third air flow path.

In the transition piece according to this aspect which includes the second air flow path, an opening area of the outlet guiding the air, which has passed through the first air flow path, into the acoustic space is larger than an opening area of the outlet guiding air, which has passed through the second air flow path, into the acoustic space.

In this aspect, when the air that has passed through the first air flow path flows into the acoustic space, the flow velocity of the air can be reduced, so that a reduction in static pressure in the acoustic space can be suppressed and the combustion gas can be suppressed from flowing into the acoustic space.

According to one aspect of the invention to achieve the above object, there is provided a combustor including: the transition piece according to one of the above aspects; and a burner that injects fuel and air into the combustion space.

According to one aspect of the invention to achieve the above object, there is provided a gas turbine including: the combustor; a compressor; a turbine; and an intermediate casing. The compressor includes a compressor rotor rotating around a rotor axis, and a compressor casing covering the compressor rotor. The turbine includes a turbine rotor rotating integrally with the compressor rotor around the rotor axis, and a turbine casing covering the turbine rotor. The intermediate casing is disposed between the compressor casing and the turbine casing in a rotor axial direction in which the rotor axis extends, and connects the compressor casing and the turbine casing, and compressed air that has been discharged from the compressor flows into the intermediate casing. The combustor is provided in the intermediate casing.

According to one aspect of the invention to achieve the above object, there is gas turbine equipment including: the gas turbine according to this aspect; a cooling air line guiding the compressed air in the intermediate casing to an outside of the intermediate casing, and then guiding the compressed air into the cooling air jacket; a cooler provided in the cooling air line, and cooling the compressed air passing through the cooling air line; and a boost compressor provided in the cooling air line, and boosting the compressed air that has been cooled by the cooler.

Advantageous Effects of Invention

According to one aspect of the present invention, while the air is allowed to flow out from the acoustic space of the acoustic damper to the space on the inner peripheral side of the pipe, the mass flow rate of the air can be suppressed.

DESCRIPTION OF EMBODIMENTS

Hereinafter, various embodiments of gas turbine equipment according to the present invention and modification examples thereof will be described in detail with reference to the drawings.

First Embodiment

Hereinafter, a first embodiment of the gas turbine equipment according to the present invention will be described with reference to FIGS. 1 to 5.

Figure 1:
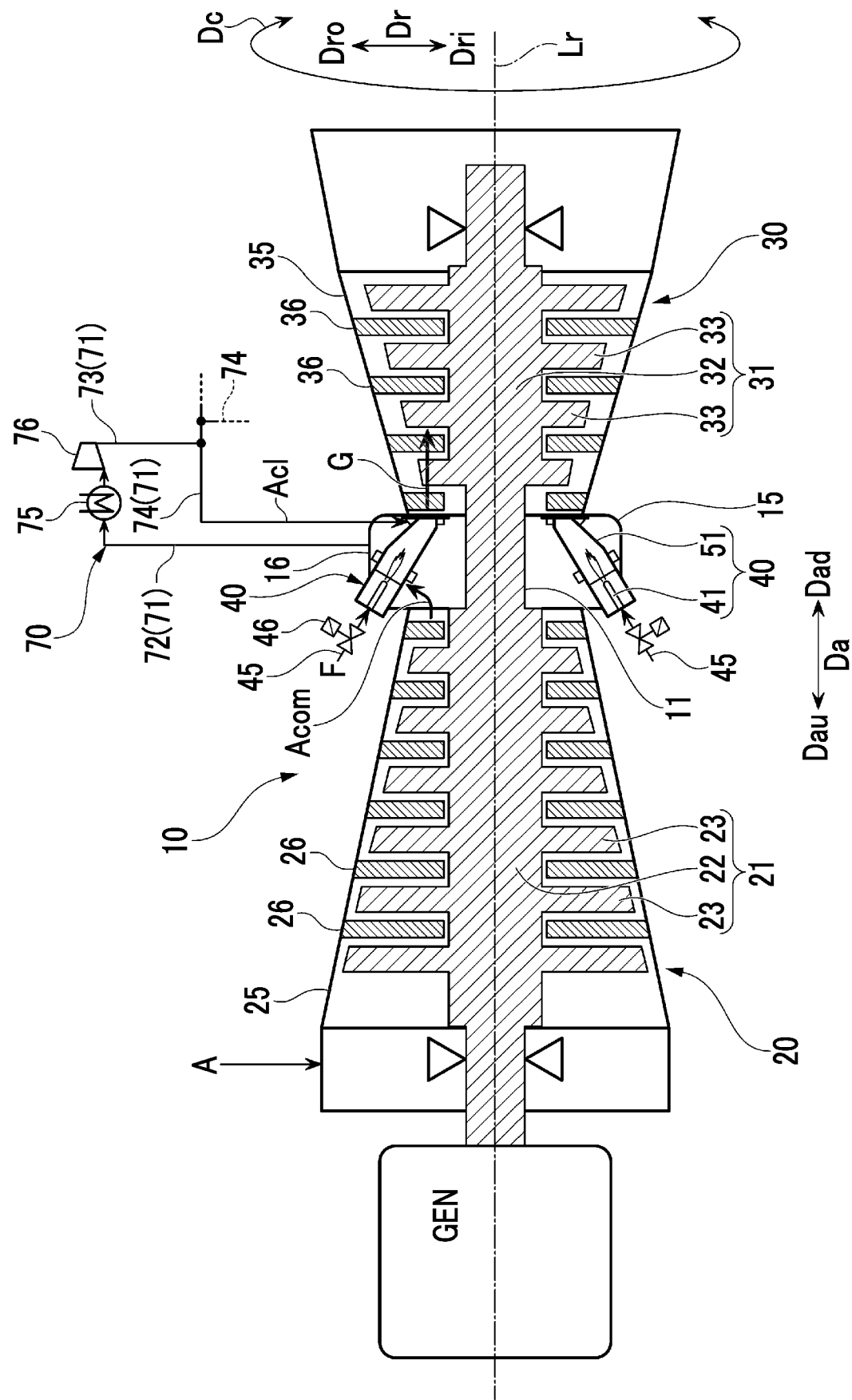
FIG. 1 is a conceptual view illustrating a configuration of gas turbine equipment according to a first embodiment of the present invention.

As illustrated in FIG. 1, the gas turbine equipment of the present embodiment includes a gas turbine 10 and a cooling device 70 that cools some components of the gas turbine 10.

The gas turbine 10 includes a compressor 20 that compresses air A; a plurality of combustors 40 that combust fuel in the air, which has been compressed by the compressor 20, to generate combustion gas G; and a turbine 30 that is driven by the combustion gas G.

The compressor 20 includes a compressor rotor 21 that rotates around a rotor axis Lr; a compressor casing 25 that rotatably covers the compressor rotor 21; an d a plurality of stator vane rows 26. Hereinafter, a direction in which the rotor axis Lr extends is referred to as a rotor axial direction Da, and one side and the other side in the rotor axial direction Da are referred to as an axial upstream side Dau and an axial downstream side Dad, respectively. In addition, a circumferential direction around the rotor axis Lr is simply referred to as a circumferential direction Dc, and a direction perpendicular to the rotor axis Lr is referred as a radial direction Dr. Further, a side approaching the rotor axis Lr in the radial direction Dr is referred to as a radial inner side Dri, and an opposite side is referred to as a radial outer side Dro.

The compressor rotor 21 includes a rotor shaft 22 extending along the rotor axis Lr in the rotor axial direction Da, and a plurality of rotor blade rows 23 attached to the rotor shaft 22. The plurality of rotor blade rows 23 are arranged in the rotor axial direction Da. Each of the rotor blade rows 23 is formed of a plurality of rotor blades arranged in the circumferential direction Dc. One stator vane row 26 of the plurality of stator vane rows 26 is disposed on the axial downstream side Dad of each of the plurality of rotor blade rows 23. Each of the stator vane rows 26 is provided inside the compressor casing 25. Each of the stator vane rows 26 is formed of a plurality of stator vanes arranged in the circumferential direction Dc. An annular space between the radial outer side Dro of the rotor shaft 22 and the radial inner side Dri of the compressor casing 25 in a region in which the stator vanes and the rotor blades are disposed in the rotor axial direction Da forms an air compression flow path in which the air is compressed while flowing therethrough.

The turbine 30 is disposed on the axial downstream side Dad of the compressor 20. The turbine 30 includes a turbine rotor 31 that rotates around the rotor axis Lr; a turbine casing 35 that rotatably covers the turbine rotor 31; and a plurality of stator vane rows 36. The turbine rotor 31 includes a rotor shaft 32 extending along the rotor axis Lr in the rotor axial direction Da, and a plurality of rotor blade rows 33 attached to the rotor shaft 32. The plurality of rotor blade rows 33 are arranged in the rotor axial direction Da. Each of the rotor blade rows 33 is formed of a plurality of rotor blades arranged in the circumferential direction Dc. One stator vane row 36 of the plurality of stator vane rows 36 is disposed on the axial upstream side Dau of each of the plurality of rotor blade rows 33. Each of the stator vane rows 36 is provided inside the turbine casing 35. Each of the stator vane rows 36 is formed of a plurality of stator vanes arranged in the circumferential direction Dc. An annular space between the radial outer side Dro of the rotor shaft 32 and the radial inner side Dri of the turbine casing 35 in a region in which the stator vanes and the rotor blades are disposed in the rotor axial direction Da forms a combustion gas flow path through which the combustion gas G from the combustors 40 flows.

The compressor rotor 21 and the turbine rotor 31 are located on the same rotor axis Lr, and are connected to each other to form a gas turbine rotor 11. For example, a rotor of a generator GEN is connected to the gas turbine rotor 11. The gas turbine 10 further includes an intermediate casing 16 having a tubular shape and having the rotor axis Lr as a center. The intermediate casing 16 is disposed between the compressor casing 25 and the turbine casing 35 in the rotor axial direction Da. The compressor casing 25 and the turbine casing 35 are connected to each other via the intermediate casing 16. The compressor casing 25, the intermediate casing 16, and the turbine casing 35 are connected to each other to form a gas turbine casing 15. Compressed air Acom from the compressor 20 flows into the intermediate casing 16. The plurality of combustors 40 are provided in the intermediate casing 16.

The cooling device 70 includes a cooling air line 71, a cooler 75, and a boost compressor 76. The cooling air line 71 bleeds the compressed air Acom in the intermediate casing 16 from the inside of the intermediate casing 16, and guides the compressed air Acom to the combustors 40. The cooling air line 71 includes an air bleeding line 72, a cooling air main line 73, and a plurality of cooling air branch lines 74. The air bleeding line 72 is connected to the intermediate casing 16, and guides the compressed air Acom in the intermediate casing 16 to the boost compressor 76. The cooling air main line 73 is connected to a discharge port of the boost compressor 76. Enhanced cooling air Acl that is air boosted by the boost compressor 76 flows through the cooling air main line 73. The cooling air branch line 74 is a line branching from the cooling air main line 73 to each of the plurality of combustors 40. Each of the plurality of cooling air branch lines 74 guides the enhanced cooling air Acl to one of the combustors 40. The cooler 75 and the boost compressor 76 are provided in the air bleeding line 72 of the cooling air line 71. The cooler 75 cools the compressed air Acom flowing through the air bleeding line 72. The boost compressor 76 boosts the compressed air Acom that has been cooled by the cooler 75, and feeds the compressed air Acom to the combustors 40 as the enhanced cooling air Acl.

Figure 2:
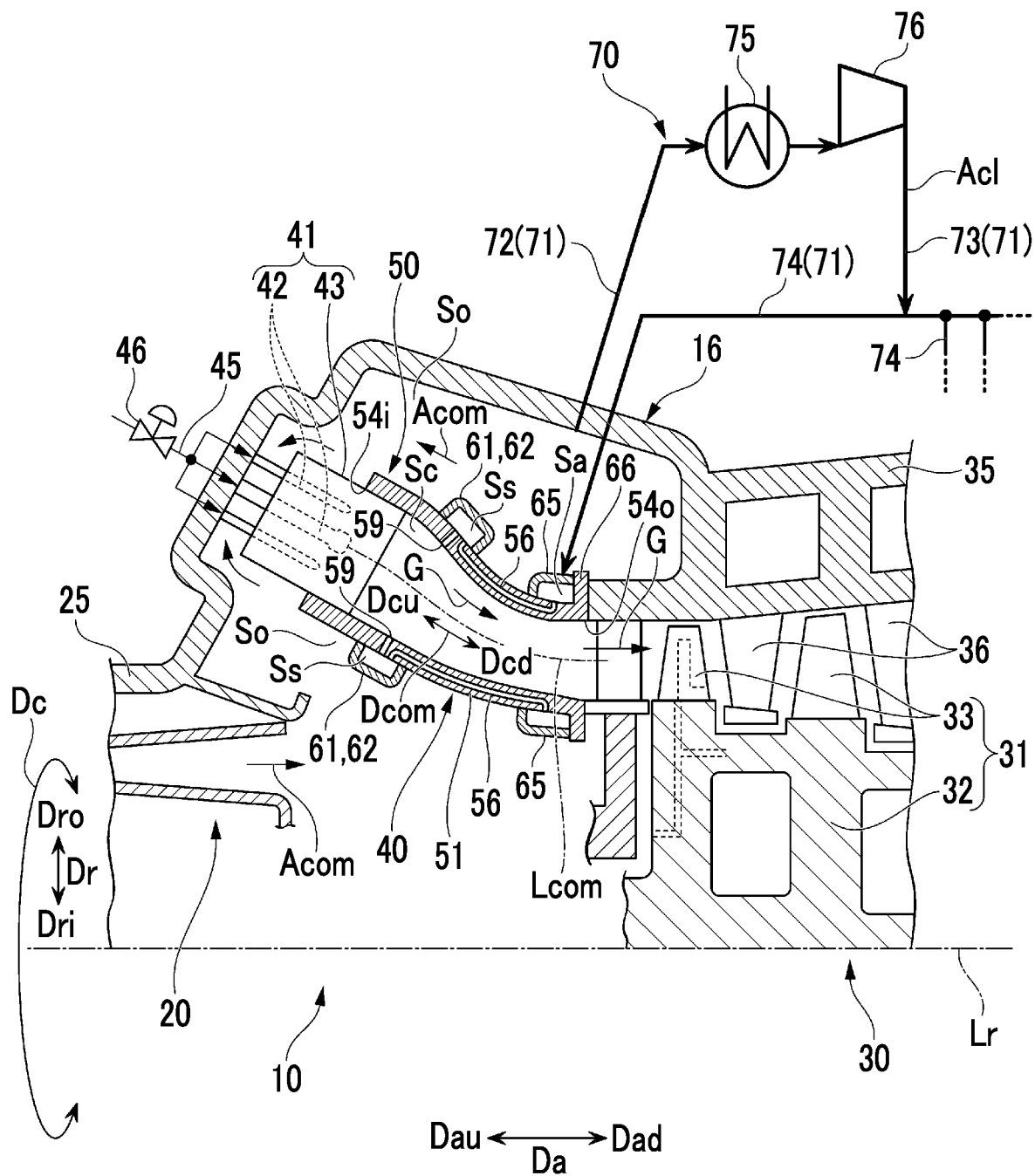
FIG. 2 is a sectional view of a main part of the gas turbine equipment according to the first embodiment of the present invention.

As illustrated in FIG. 2, the combustor 40 includes a transition piece (or combustion pipe) 50 that feeds the high-temperature and high-pressure combustion gas G into the combustion gas flow path of the turbine 30, and a fuel nozzle 41 that injects fuel F into the transition piece 50, together with the compressed air Acom. The fuel nozzle 41 includes a plurality of burners 42 that inject the fuel F into the transition piece 50, and a frame 43 that supports the plurality of burners 42. A fuel line 45 is connected to each of the burners 42. The fuel line 45 is provided with a fuel flow rate-regulating valve 46 that regulates the flow rate of the fuel F to be supplied to the plurality of burners 42. The transition piece 50 of the combustor 40 is disposed inside the intermediate casing 16.

The transition piece 50 includes a pipe 51 having a tubular shape around a combustor axis Lcom; an acoustic damper 61 forming an acoustic space Ss on an outer peripheral side of the pipe 51; a cooling air jacket 65 forming a cooling air space Sa on the outer peripheral side of the pipe 51; and an attachment flange 66. Hereinafter, a direction in which the combustor axis Lcom extends is referred to as a combustor axial direction Dcom (hereinafter, simply referred to as an axial direction Dcom). In addition, one side in the axial direction Dcom is referred to as a combustor upstream side Dcu (hereinafter, simply referred to as an upstream side Dcu), and the other side in the axial direction Dcom is referred to as a combustor downstream side Dcd (hereinafter, simply referred to as a downstream side Dcd).

The pipe 51 includes an inlet opening 54i formed at an end on the upstream side Dcu; an outlet opening 54o formed at an end on the downstream side Dcd; an outer peripheral surface 55o facing the outer peripheral side; and an inner peripheral surface 55*i* facing an inner peripheral side. A space on the inner peripheral side of the pipe 51 is a combustion space Sc in which the fuel F is combusted and through which the combustion gas G generated by the combustion flows. The attachment flange 66 extends from the outer peripheral surface 55*o* of the pipe 51 to the outer peripheral side at an end on the downstream side Dcd of the pipe 51. The attachment flange 66 is a flange for attaching the pipe 51 to the turbine casing 35.

The acoustic damper 61 includes a part of a panel forming the pipe 51, and an acoustic cover 62 forming the acoustic space Ss on the outer peripheral side of the pipe 51 in conjunction with the part of the pipe 51. The acoustic cover 62 is provided in a portion on the upstream side Dcu of the pipe 51. The acoustic cover 62 extends in the circumferential direction with respect to the combustor axis Lcom.

The cooling air jacket 65 forms the cooling air space Sa on the outer peripheral side of the pipe 51 in conjunction with another part except for the portion forming the acoustic damper 61 in the panel forming the pipe 51, and the attachment flange 66. For this reason, a part of an edge of the cooling air jacket 65 is in contact with the attachment flange 66, and the remainder of the edge of the cooling air jacket 65 is in contact with the pipe 51. The cooling air space Sa is isolated from an outer space So that is a space on the outer peripheral side of the pipe 51. The outer space So is a space on the outer peripheral side of the pipe 51 and inside the intermediate casing 16, excluding the acoustic space Ss and the cooling air space Sa. During operation of the gas turbine 10, the compressed air Acom that has been discharged from the compressor 20 is present in the outer space So. In addition, the fact that the cooling air space Sa is isolated from the outer space So means that the compressed air Acom in the outer space So does not directly flow into the cooling air space Sa. As described above, the cooling air jacket 65 is in contact with the attachment flange 66 provided at the end on the downstream side Dcd of the pipe 51, which means that the cooling air jacket 65 is located on the downstream side Dcd of the acoustic cover 62. The cooling air branch lines 74 of the cooling device 70 described above are connected to the cooling air jacket 65. Therefore, the enhanced cooling air Acl from the cooling device 70 flows into the cooling air space Sa.

Figure 3:
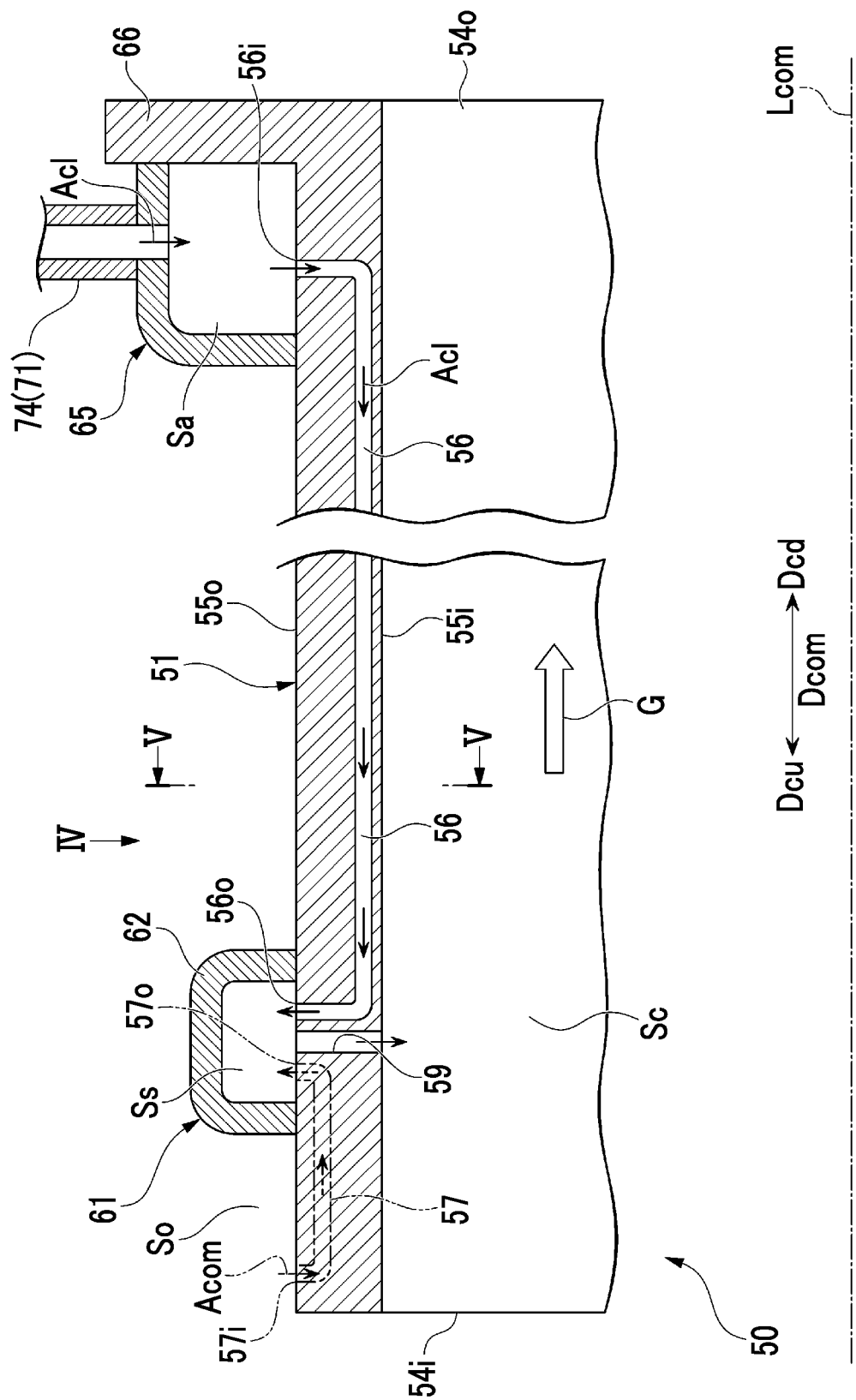
FIG. 3 is a sectional view of a main part of a transition piece according to the first embodiment of the present invention.
Figure 4:
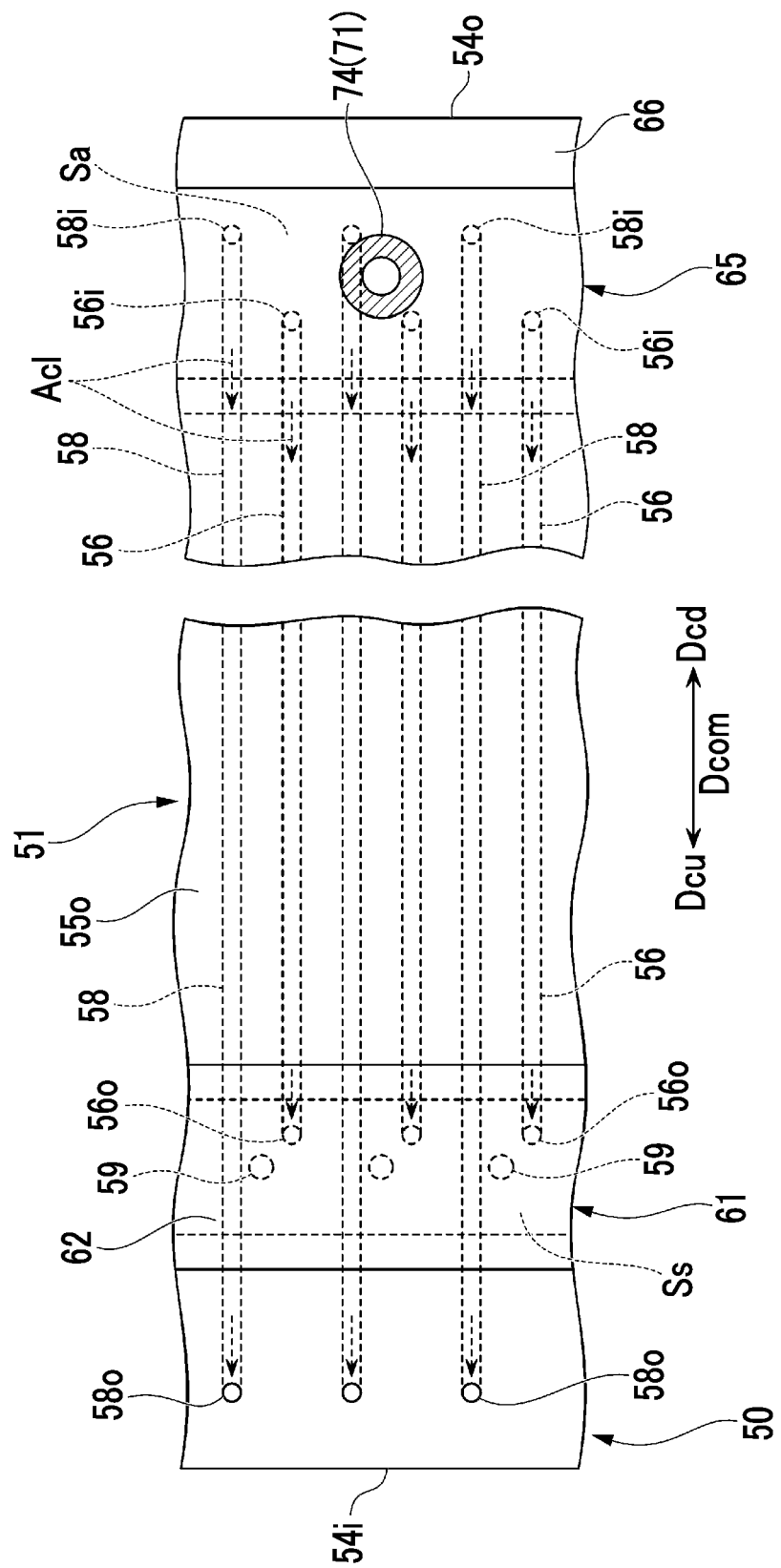
FIG. 4 is a view on arrow IV in FIG. 3.

As illustrated in FIGS. 3 and 4, the pipe 51 includes a plurality of acoustic holes 59, a plurality of first air flow paths 56, and a plurality of third air flow paths 58. FIG. 3 is a sectional view of a main part of the transition piece 50 taken along a virtual plane including the combustor axis Lcom, and FIG. 4 is a view on arrow IV in FIG. 3.

The acoustic hole 59 penetrates through the panel forming the pipe 51 from the acoustic space Ss to the combustion space Sc. Therefore, the acoustic hole 59 is a hole penetrating through a portion of the pipe 51, which is covered by the acoustic cover 62, from the outer peripheral surface 55*o* to the inner peripheral surface 55*i* of the pipe 51.

Both the first air flow path 56 and the third air flow path 58 are formed between the outer peripheral surface 55*o* and the inner peripheral surface 55*i* of the pipe 51. The first air flow path 56 includes an inlet 56*i* that faces the cooling air space Sa and that guides the air in the cooling air space Sa into the first air flow path 56, and an outlet 56*o* that faces the acoustic space Ss and that guides the air, which has passed through the first air flow path 56, into the acoustic space Ss. Therefore, the inlet 56*i* of the first air flow path 56 is formed in a portion of the outer peripheral surface 55*o* of the pipe 51, the portion being covered by the cooling air jacket 65. In addition, the outlet 56*o* of the first air flow path 56 is formed in a portion of the outer peripheral surface 55*o* of the pipe 51, the portion being covered by the acoustic cover 62. The third air flow path 58 includes an inlet 58*i* that faces the cooling air space Sa and that guides the air in the cooling air space Sa into the third air flow path 58, and an outlet 58*o* that faces the outer space So and that guides the air, which has passed through the third air flow path 58, into the outer space So. Therefore, the inlet 58*i* of the third air flow path 58 is formed in a portion of the outer peripheral surface 55*o* of the pipe 51, the portion being covered by the cooling air jacket 65. In addition, the outlet 58*o* of the third air flow path 58 is formed in a portion of the outer peripheral surface 55*o* of the pipe 51, the portion not being covered by the acoustic cover 62 and the cooling air jacket 65. Among the plurality of third air flow paths 58, the outlets 58*o* of some of the third air flow paths 58 are formed in a portion on the upstream side Dcu of the outer peripheral surface 55*o* of the pipe 51 with respect to the portion covered by the acoustic cover 62.

Figure 5:
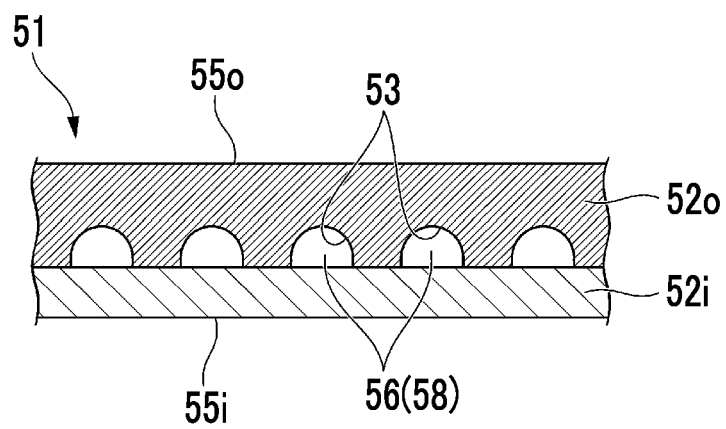
FIG. 5 is a sectional view taken along line V-V in FIG. 3.

As illustrated in FIG. 5, the panel forming the pipe 51 is formed by joining an outer peripheral wall panel 52*o* and an inner peripheral wall panel 52*i* by means of brazing or the like. A plurality of grooves 53 that are recessed in a direction away from the other side and that are long in the axial direction Dcom are formed in one wall panel of the outer peripheral wall panel 52*o* and the inner peripheral wall panel 52*i*. An air flow path 56 (58) through which the air flows is formed between an inner surface of the groove 53 and a surface of the other wall panel. In the present embodiment, the grooves 53 are formed in the outer peripheral wall panel 52*o*.

Next, an operation of the gas turbine 10 described above will be described.

The compressor 20 suctions outside air A, and compresses the air while the air passes through the air compression flow path. The compressed air, namely, the compressed air Acom, flows from the air compression flow path of the compressor 20 into the intermediate casing 16. The compressed air Acom is supplied into the pipe 51 of the transition piece 50 via the fuel nozzle 41 of the combustor 40. The fuel F is injected into the pipe 51 of the transition piece 50 from the plurality of burners 42 of the fuel nozzle 41. The fuel F is combusted in the compressed air Acom that has been supplied into the combustion space Sc of the pipe 51. As a result of the combustion, the combustion gas G is generated, and the combustion gas G flows from the transition piece 50 into the combustion gas flow path of the turbine 30. When the combustion gas G passes through the combustion gas flow path, the turbine rotor 31 rotates.

While the fuel F is combusted in the combustion space Sc, the boost compressor 76 of the cooling device 70 is driven. For this reason, the compressed air Acom in the outer space So, in other words, some of the compressed air Acom in the intermediate casing 16, is bled from the inside of the intermediate casing 16, flows into the cooler 75 of the cooling device 70, and then is cooled here. The compressed air Acom that has been cooled in the cooler 75 is boosted by the boost compressor 76, and then flows into the cooling air space Sa of the transition piece 50 as the enhanced cooling air Acl. Since the enhanced cooling air Acl is air obtained by cooling and then boosting the compressed air Acom in the intermediate casing 16, the enhanced cooling air Acl has a lower temperature and a higher pressure than those of the compressed air Acom in the intermediate casing 16.

The enhanced cooling air Acl in the cooling air space Sa flows into the first air flow path 56 and the third air flow path 58 of the pipe 51 to flow through the air flow paths 56 and 58. The enhanced cooling air Acl is heated while cooling the pipe 51 because of heat exchange with the pipe 51, which is exposed to the high-temperature combustion gas G, in the process of flowing through the air flow paths 56 and 58.

The enhanced cooling air Acl that has passed through the third air flow path 58 flows out to the outer space So from the outlet 58o of the third air flow path 58, and is mixed with the compressed air Acom present in the outer space So. In addition, the enhanced cooling air Acl that has passed through the first air flow path 56 flows from the outlet 56o of the first air flow path 56 into the acoustic space Ss. The enhanced cooling air Acl that has flowed into the acoustic space Ss flows out to the combustion space Sc from the acoustic hole 59. For this reason, the combustion gas G in the combustion space Sc does not flow into the acoustic space Ss.

In order to ensure that the combustion gas G in the combustion space Sc does not flow into the acoustic space Ss, a pressure Ps in the acoustic space Ss needs to be higher than a pressure Pc in the combustion space Sc, and a pressure difference ΔP between both pressures (=Ps−Pc>0) needs to be a certain value or more.

The pressure difference ΔP is proportional to a density p of a fluid and is proportional to the square of a flow velocity v of the fluid as expressed by the following equation.

$$\Delta \propto \rho \cdot v^2$$

As can be understood from the above equation, when the pressure difference ΔP is to be set to the certain value or more, increasing the flow velocity v of the fluid is more effective than increasing the density p of the fluid. In addition, the flow velocity v of a fluid is increased by increasing the volume of the fluid while reducing the density p of the fluid, so that the mass flow rate of the fluid flowing out from the acoustic space Ss to the combustion space Sc can be suppressed. As a method for increasing the volume of the fluid while reducing the density p of the fluid, there is a method in which the fluid is expanded by increasing the amount of heating of the fluid.

Here, in order to facilitate understanding of the following description, a comparative example of this aspect will be described. A pipe of the comparative example does not include the first air flow path 56, but includes a second air flow path 57 illustrated by an imaginary line (alternate long and two short dashed line) in FIG. 3. The second air flow path 57 is formed between the outer peripheral surface 55o and the inner peripheral surface 55i of the pipe 51. The second air flow path 57 includes an inlet 57i that faces the outer space So and that guides the air in the outer space So into the second air flow path 57, and an outlet 57o that faces the acoustic space Ss and that guides the air, which has passed through the second air flow path 57, into the acoustic space Ss. The inlet 57i of the second air flow path 57 is located on the upstream side Dcu of the acoustic cover 62. The air in the outer space So flows into the second air flow path 57 from the inlet 57i of the second air flow path 57 to flow through the second air flow path 57. The air is heated while cooling the pipe because of heat exchange with the pipe 51, which is exposed to the combustion gas G, in the process of flowing through the second air flow path 57. The air that has passed through the second air flow path 57 flows from the outlet 57o of the second air flow path 57 into the acoustic space Ss. The air that has flowed into the acoustic space Ss flows out to the combustion space Sc from the acoustic hole 59.

In the comparative example, when the air in the outer space So, namely, the compressed air Acom, has a constant pressure and a constant temperature, as a method for increasing the amount of heating of the air flowing through the second air flow path 57, for example, there is a method for lengthening the flow path length of the second air flow path 57. In this method, the following problems occur.

(1) There is a possibility that the pressure loss in the second air flow path 57 increases, so that the air in the outer space So does not reach the acoustic space Ss, or does not flow out to the combustion space Sc from the acoustic hole 59.

(2) There is a possibility that the temperature of the air becomes very high by the time the air reaches the acoustic space Ss, so that the air has no capability to cool the pipe 51.

In addition, there is also another method for forming the second air flow path 57 in a region of the pipe 51 which is easily heated by the combustion gas G. Even in this method, the above problem (2) occurs.

In the present embodiment, the enhanced cooling air Acl in the cooling air space Sa isolated from the outer space So flows through the first air flow path 56. Therefore, in the present embodiment, the air having a pressure and a temperature different from those of the compressed air Acom in the outer space So is capable of flowing through the first air flow path 56. Therefore, in the present embodiment, the enhanced cooling air Acl having a higher pressure and a lower temperature than those of the compressed air Acom in the outer space So flows through the first air flow path 56. For this reason, in the present embodiment, as the method for increasing the amount of heating of the air, even when the method for lengthening the flow path length of the first air flow path 56 and/or the method for forming the first air flow path 56 in a region of the pipe 51 which is easily heated by the combustion gas G are adopted, the above problems (1) and (2) do not occur.

Therefore, in the present embodiment, the pressure difference ΔP (=Ps−Pc) between the pressure Ps in the acoustic space Ss and the pressure Pc in the combustion space Sc is set to the certain value or more, so that while the air is allowed to flow out from the acoustic space Ss to the combustion space Sc on the inner peripheral side of the pipe 51, the mass flow rate of the air can be suppressed.

As described above, in the present embodiment, since the mass flow rate of the air flowing out from the acoustic space Ss to the combustion space Sc on the inner peripheral side of the pipe 51 can be suppressed, the amount of NOx generated can be suppressed. Further, in the present embodiment, since the amount of the combustion gas G diluted by the air flowing out to the combustion space Sc is decreased, a reduction in the temperature of the gas to be fed to the turbine 30 can be suppressed, and a reduction in the efficiency of the gas turbine 10 can be suppressed.

In the present embodiment, as the method for increasing the amount of heating of the air, the method for lengthening the flow path length of the first air flow path 56 and the method for forming the first air flow path 56 in a region of the pipe 51 which is easily heated by the combustion gas G are adopted. Specifically, in the present embodiment, the flow path length of the first air flow path 56 is lengthened by providing the cooling air jacket 65 in a portion on the downstream side Dcd of the pipe 51, and allowing the cooling air space Sa in the cooling air jacket 65 and the acoustic space Ss in the acoustic damper 61, which is disposed in a portion on the upstream side Dcu of the pipe 51, to communicate with each other through the first air flow path 56. In the combustion space Sc of the pipe 51, the temperature on the downstream side Dcd from a tip portion of a flame formed by the combustion of the fuel F is higher than the temperature on the upstream side Dcu from the tip portion of the flame. Therefore, a region on the downstream side Dcd of the pipe 51 is more easily heated by the combustion gas G than a region on the upstream side Dcu. Therefore, in the present embodiment, the first air flow path 56 is formed in a region on the downstream side Dcd of the pipe 51 which is easily heated.

In the present embodiment, as described above, as the method for increasing the amount of heating of the air, the method for lengthening the flow path length of the first air flow path 56 and the method for forming the first air flow path 56 in a region of the pipe 51 which is easily heated by the combustion gas G are both adopted. However, only one of the above two methods may be adopted.

Second Embodiment

Figure 6:
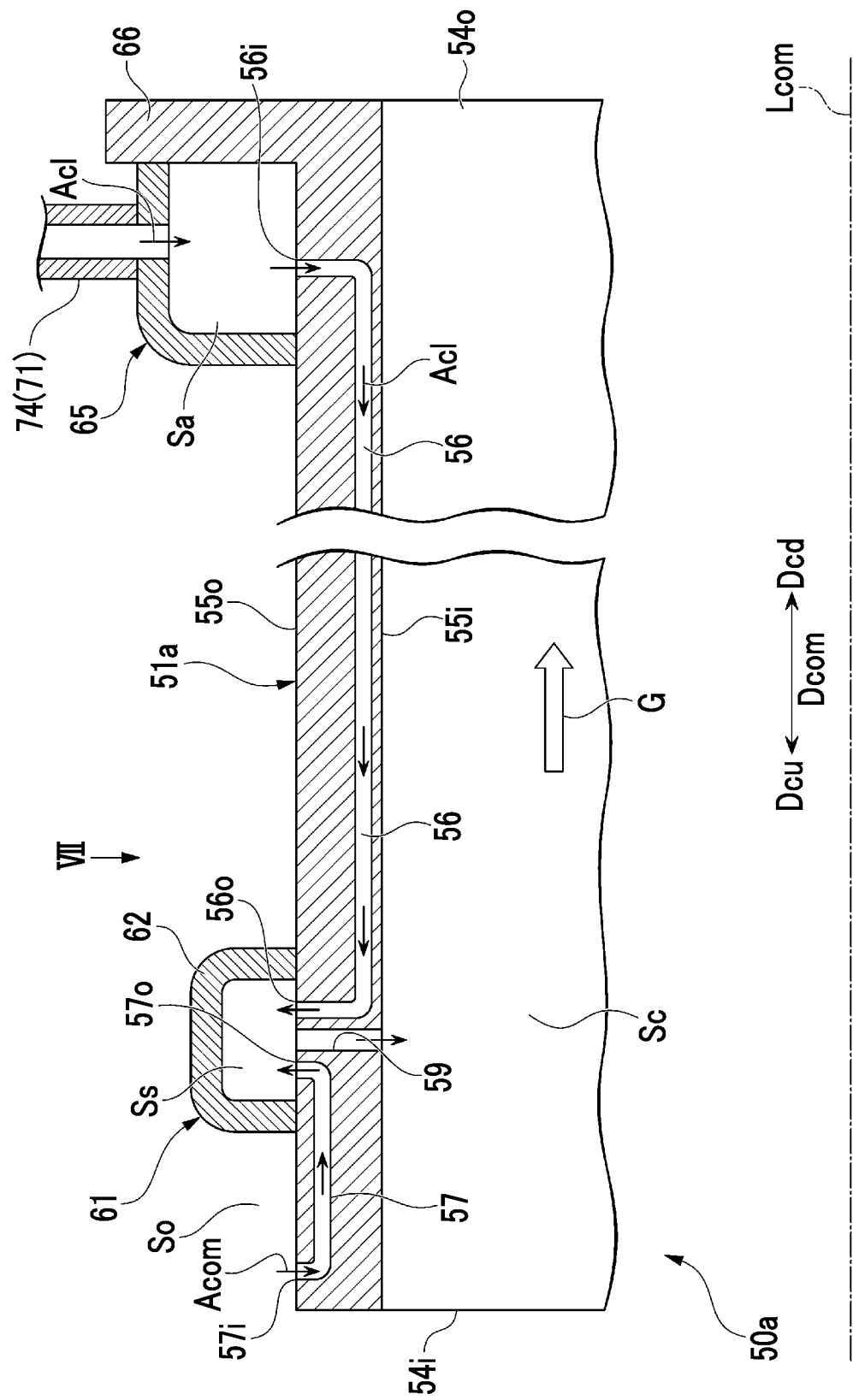
FIG. 6 is a sectional view of a main part of a transition piece according to a second embodiment of the present invention.
Figure 7:
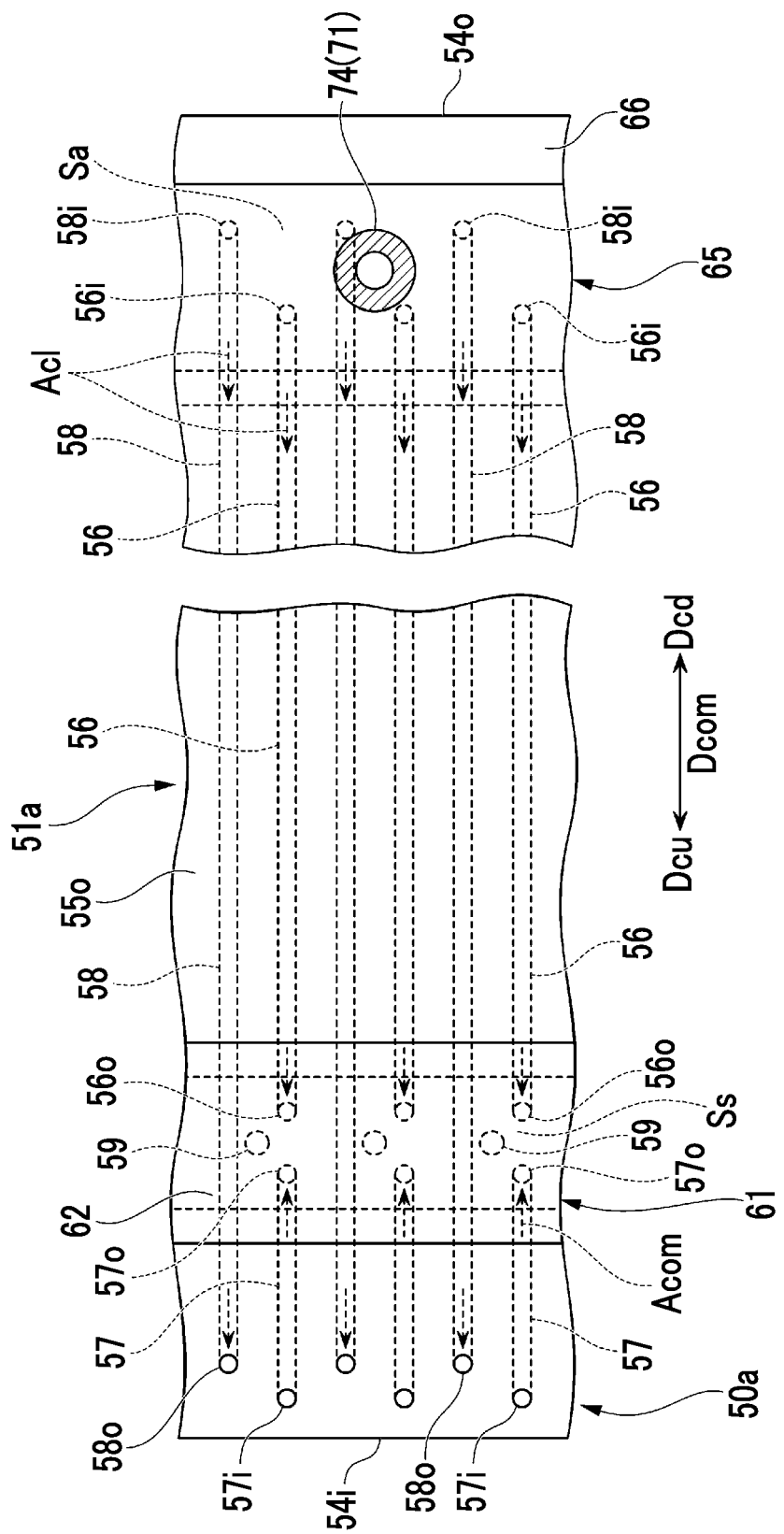
FIG. 7 is a view on arrow VII in FIG. 6.

Hereinafter, a second embodiment of the gas turbine equipment according to the present invention will be described with reference to FIGS. 6 and 7. The gas turbine equipment of the present embodiment differs from the gas turbine equipment of the first embodiment only in the configuration of the transition piece of the combustor. Therefore, hereinafter, a configuration of a transition piece 50a of the present embodiment will be mainly described.

Similarly to the first embodiment, the transition piece 50a of the present embodiment includes a pipe 51a; the acoustic damper 61; the cooling air jacket 65; and the attachment flange 66. Similarly to the pipe 51 of the first embodiment, the pipe 51a includes the inlet opening 54i; the outlet opening 54o; the outer peripheral surface 55o; the inner peripheral surface 55i; a plurality of the first air flow paths 56; and a plurality of the third air flow paths 58. The pipe 51a of the present embodiment further includes a plurality of the second air flow paths 57. The second air flow path 57 is formed between the outer peripheral surface 55o and the inner peripheral surface 55i of the pipe 51a. The second air flow path 57 includes the inlet 57i that faces the outer space So and that guides the compressed air Acom in the outer space So into the second air flow path 57, and the outlet 57o that faces the acoustic space Ss and that guides the compressed air Acom, which has passed through the second air flow path 57, into the acoustic space Ss. The inlet 57i of the second air flow path 57 is located on the upstream side Dcu of the acoustic cover 62. The pipe 51a of the present embodiment includes the third air flow path 58, but may not include the third air flow path 58.

Also in the present embodiment, similarly to the first embodiment, the enhanced cooling air Acl in the cooling air space Sa flows into the first air flow path 56 and the third air flow path 58 of the pipe 51a to flow through the air flow paths 56 and 58. The enhanced cooling air Acl is heated while cooling the pipe 51a because of heat exchange with the pipe 51a, which is exposed to the high-temperature combustion gas G, in the process of flowing through the air flow paths 56 and 58. The enhanced cooling air Acl that has passed through the third air flow path 58 flows out to the outer space So from the outlet 58o of the third air flow path 58, and is mixed with the compressed air Acom present in the outer space So. In addition, the enhanced cooling air Acl that has passed through the first air flow path 56 flows from the outlet 56o of the first air flow path 56 into the acoustic space Ss.

The compressed air Acom in the outer space So flows into the second air flow path 57 from the inlet 57i of the second air flow path 57 to flow through the second air flow path 57. The compressed air Acom is heated while cooling the pipe 51a because of heat exchange with the pipe 51a, which is exposed to the combustion gas G, in the process of flowing through the second air flow path 57. The compressed air Acom that has passed through the second air flow path 57 flows from the outlet 57o of the second air flow path 57 into the acoustic space Ss.

Therefore, in the present embodiment, the enhanced cooling air Acl that has flowed through the first air flow path 56 and the compressed air Acom that has flowed through the second air flow path 57 flow into the acoustic space Ss. The air that has flowed into the acoustic space Ss flows out to the combustion space Sc through the acoustic hole 59. As described above, in the present embodiment, similarly to the first embodiment, since the air flowing out from the acoustic space Ss to the combustion space Sc through the acoustic hole 59 includes the enhanced cooling air Acl that has flowed through the first air flow path 56, the air having a large amount of heating of the air is capable of flowing out to the combustion space Sc. Therefore, also in the present embodiment, similarly to the first embodiment, while the air is allowed to flow out from the acoustic space Ss to the combustion space Sc, the mass flow rate of the air can be suppressed.

In the first embodiment, a portion on the upstream side Dcu of the pipe 51 with respect to the acoustic cover 62 is cooled by the air flowing through the third air flow path 58. The amount of heating of the air flowing through the third air flow path 58 by the time the air reaches the acoustic cover 62 is large. On the other hand, in the present embodiment, the portion on the upstream side Dcu of the pipe 51a with respect to the acoustic cover 62 is cooled by the air flowing through the second air flow path 57. In the portion on the upstream side Dcu of the pipe 51a with respect to the acoustic cover 62, the temperature of the air flowing through the second air flow path 57 is lower than the temperature of the air flowing through the third air flow path 58. For this reason, in the present embodiment, the cooling capacity of the portion on the upstream side Dcu of the pipe 51a with respect to the acoustic cover 62 can be increased more than in the first embodiment.

Third Embodiment

Figure 8:
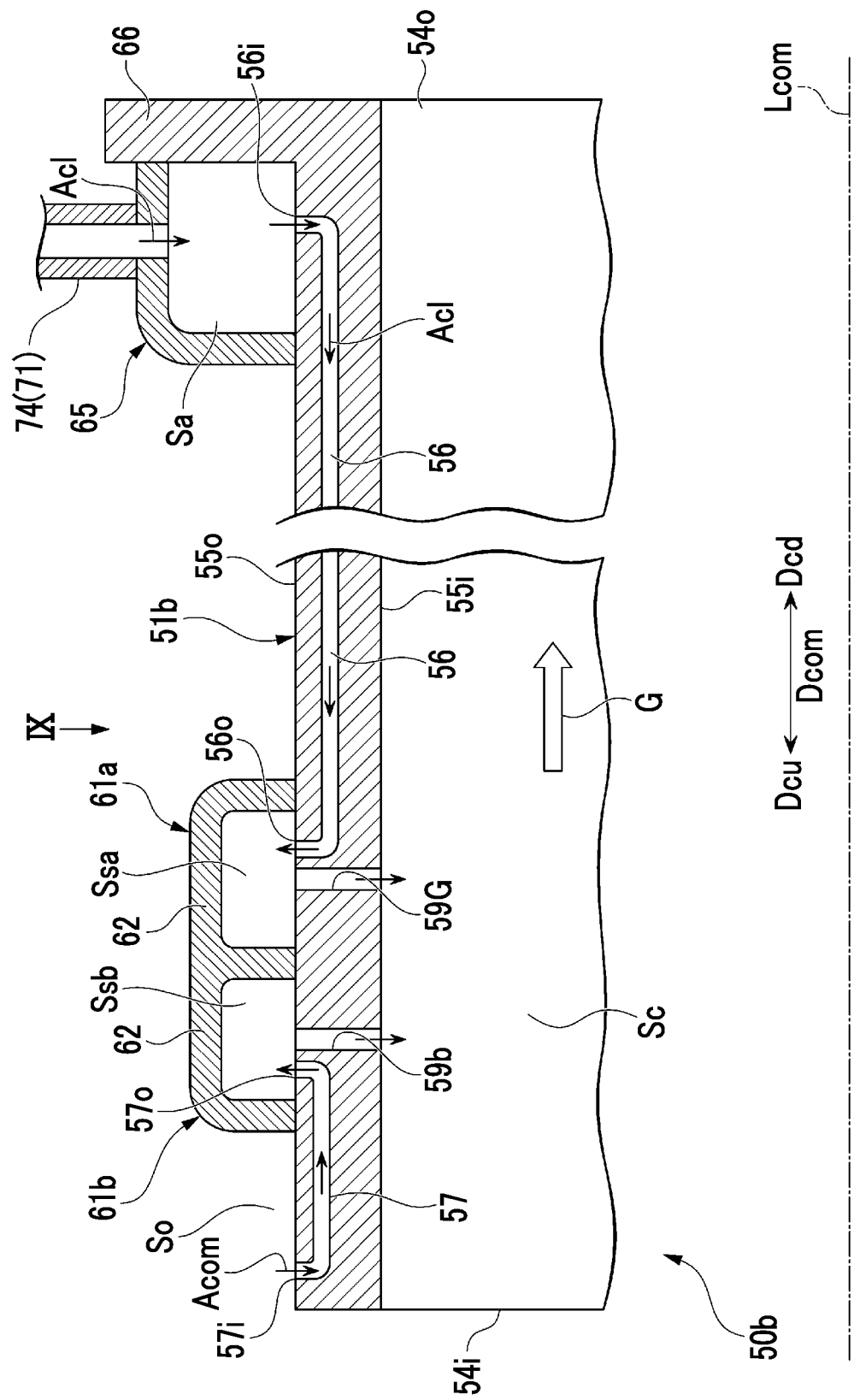
FIG. 8 is a sectional view of a main part of a transition piece according to a third embodiment of the present invention.
Figure 9:
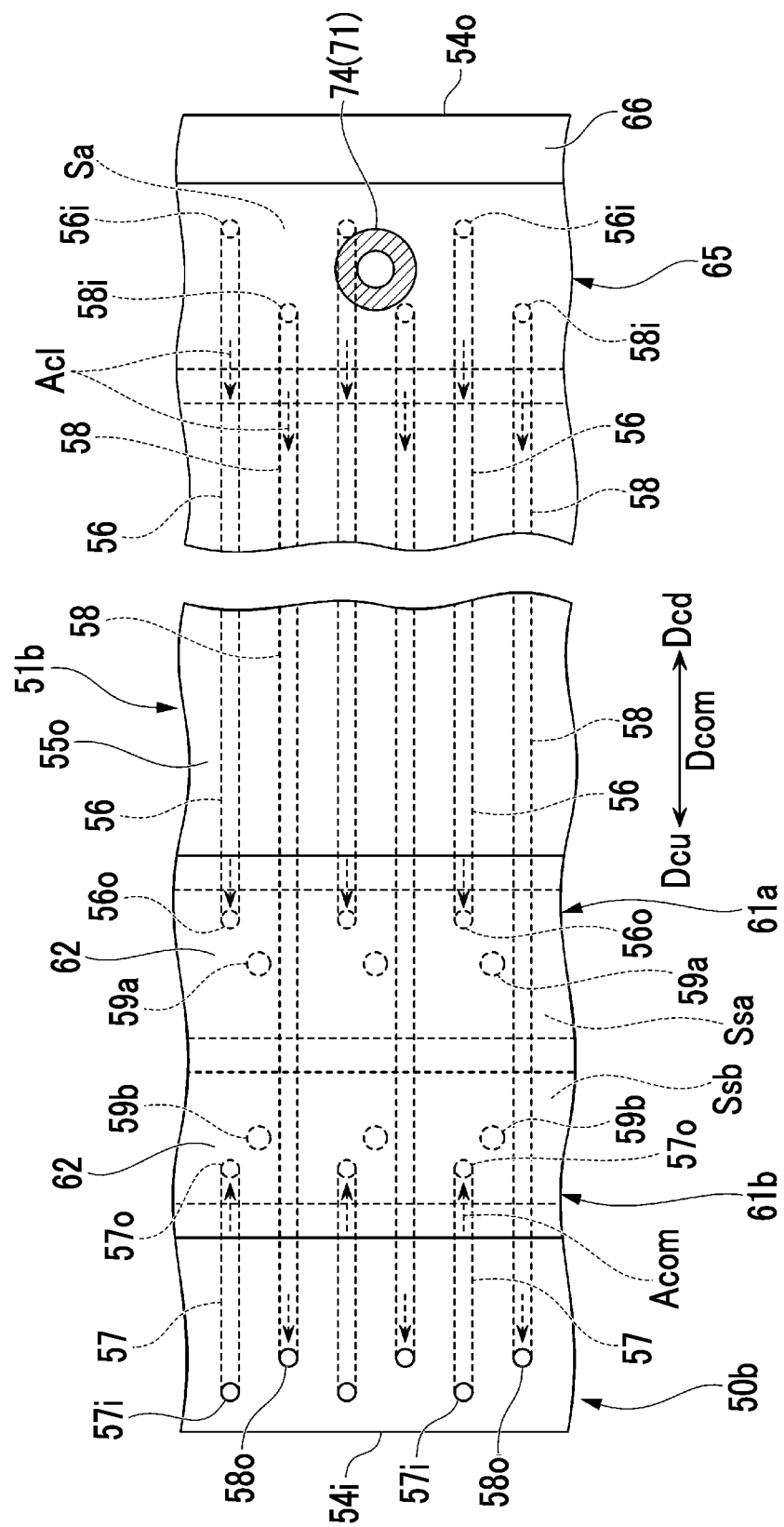
FIG. 9 is a view on arrow IX in FIG. 8.

Hereinafter, a third embodiment of the gas turbine equipment according to the present invention will be described with reference to FIGS. 8 and 9. The gas turbine equipment of the present embodiment differs from the gas turbine equipment of the first embodiment only in the configuration of the transition piece of the combustor. Therefore, hereinafter, a configuration of a transition piece 50b of the present embodiment will be mainly described.

Similarly to the first embodiment, the transition piece 50b of the present embodiment includes a pipe 51b; acoustic dampers 61a and 61b; the cooling air jacket 65; and the attachment flange 66. However, the transition piece 50b of the present embodiment includes a plurality of the acoustic dampers 61a and 61b. Similarly to the pipe 51 of the first embodiment, the pipe 51b includes the inlet opening 54i; the outlet opening 54o; the outer peripheral surface 55o; the inner peripheral surface 55i; a plurality of the first air flow paths 56; and a plurality of the third air flow paths 58. The outlet 56o of the first air flow path 56 of the present embodiment faces only a first acoustic space Ssa of the first acoustic damper 61a of the plurality of acoustic dampers 61a and 61b, and does not face a second acoustic space Ssb of the second acoustic damper 61b. Therefore, in the present embodiment, the enhanced cooling air Acl in the cooling air space Sa flows into the first acoustic space Ssa through the first air flow path 56, but does not flow into the second acoustic space Ssb. The pipe 51b of the present embodiment further includes a plurality of the second air flow paths 57. The second air flow path 57 is formed between the outer peripheral surface 55o and the inner peripheral surface 55i of the pipe 51b. The second air flow path 57 includes the inlet 57i that faces the outer space So and that guides the air in the outer space So into the second air flow path 57, and the outlet 57o that faces only the second acoustic space Ssb and that guides the air, which has passed through the second air flow path 57, into the second acoustic space Ssb. Therefore, in the present embodiment, the compressed air Acom in the outer space So flows into the second acoustic space Ssb through the second air flow path 57, but does not flow into the first acoustic space Ssa. The inlet 57i of the second air flow path 57 is located on the upstream side Dcu of the respective acoustic covers 62 of the plurality of acoustic dampers 61a and 61b. The pipe 51b of the present embodiment includes the third air flow path 58, but may not include the third air flow path 58.

Also in the present embodiment, similarly to the first embodiment, the enhanced cooling air Acl in the cooling air space Sa flows into the first air flow path 56 and the third air flow path 58 of the pipe 51b to flow through the air flow paths 56 and 58. The enhanced cooling air Acl is heated while cooling the pipe 51b because of heat exchange with the pipe 51b, which is exposed to the high-temperature combustion gas G, in the process of flowing through the air flow paths 56 and 58. The air that has passed through the third air flow path 58 flows out to the outer space So from the outlet 58o of the third air flow path 58, and is mixed with the compressed air Acom present in the outer space So. In addition, the enhanced cooling air Acl that has passed through the first air flow path 56 flows from the outlet 56o of the first air flow path 56 into the first acoustic space Ssa. The air that has flowed into the first acoustic space Ssa flows out to the combustion space Sc from a first acoustic hole 59a of the first acoustic damper 61a.

The compressed air Acom in the outer space So flows into the second air flow path 57 from the inlet 57i of the second air flow path 57 to flow through the second air flow path 57. The compressed air Acom is heated while cooling the pipe 51b because of heat exchange with the pipe 51b, which is exposed to the combustion gas G, in the process of flowing through the second air flow path 57. The compressed air Acom that has passed through the second air flow path 57 flows from the outlet 57o of the second air flow path 57 into the second acoustic space Ssb. The compressed air Acom that has flowed into the second acoustic space Ssb flows out to the combustion space Sc from a second acoustic hole 59b of the second acoustic damper 61b.

As described above, in the present embodiment, the enhanced cooling air Acl that has flowed through the first air flow path 56 flows into the first acoustic space Ssa of a plurality of the acoustic spaces Ss. The air that has flowed into the first acoustic space Ssa flows out to the combustion space Sc through the first acoustic hole 59a. For this reason, in the present embodiment, the total mass flow rate of the air flowing out from all the acoustic spaces Ssa and Ssb to the combustion space Sc can be suppressed more than when only the compressed air Acom that has flowed through the second air flow path 57 flows into all the acoustic spaces Ssa and Ssb.

In addition, in the present embodiment, similarly to the second embodiment, since the second air flow path 57 is provided, the cooling capacity of the portion on the upstream side Dcu of the pipe 51b with respect to the acoustic cover 62 can be increased more than in the first embodiment.

Fourth Embodiment

Figure 10:
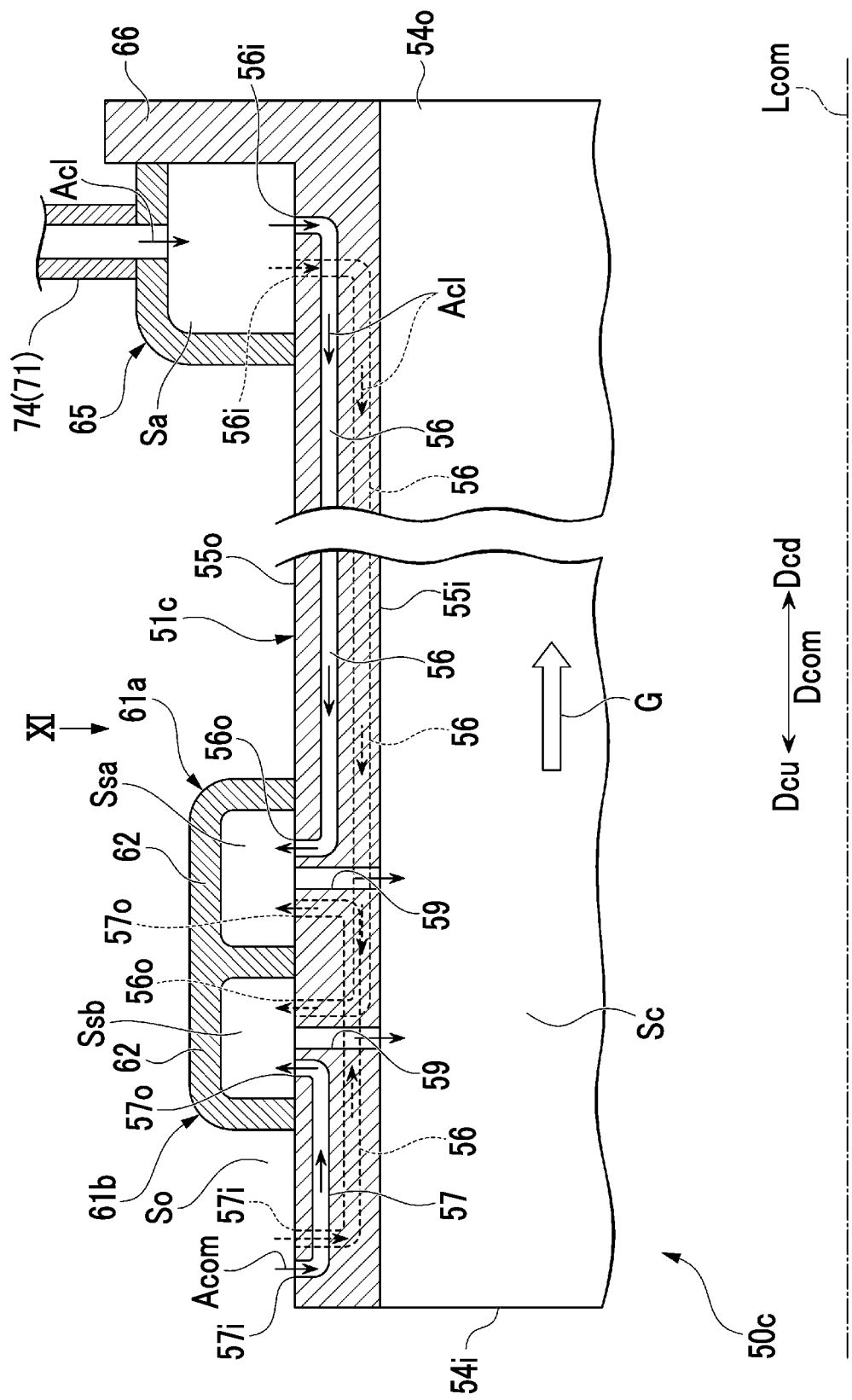
FIG. 10 is a sectional view of a main part of a transition piece according to a fourth embodiment of the present invention.
Figure 11:
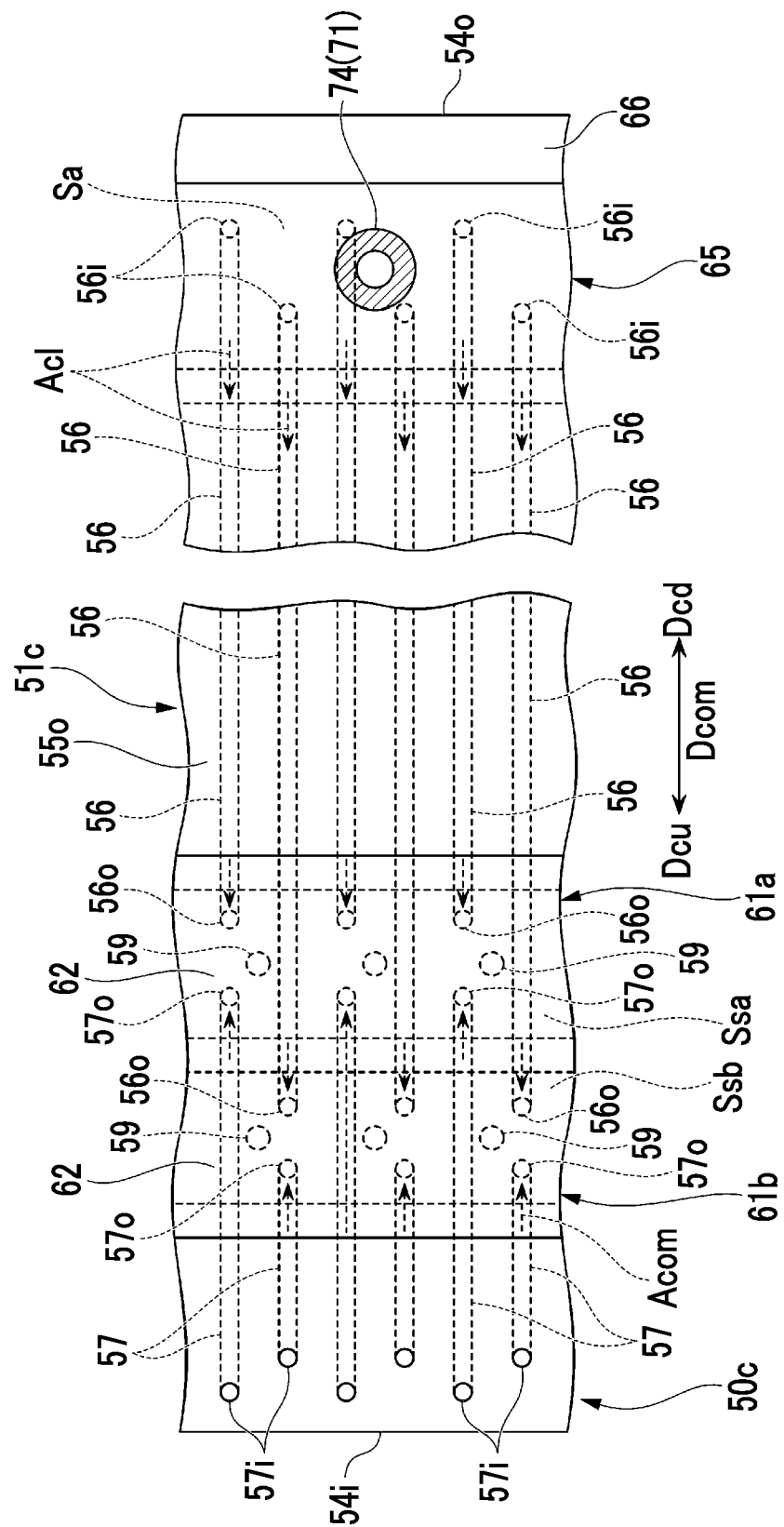
FIG. 11 is a view on arrow XI in FIG. 10.

Hereinafter, a fourth embodiment of the gas turbine equipment according to the present invention will be described with reference to FIGS. 10 and 11. The gas turbine equipment of the present embodiment is a modification example of the third embodiment, and differs from the gas turbine equipment of the third embodiment only in the configuration of the transition piece of the combustor. Therefore, hereinafter, a configuration of a transition piece 50c of the present embodiment will be mainly described.

Similarly to the third embodiment, the transition piece 50c of the present embodiment includes a pipe 51c; a plurality of the acoustic dampers 61a and 61b; the cooling air jacket 65; and the attachment flange 66. Similarly to the pipe 51b of the third embodiment, the pipe 51c includes the inlet opening 54i; the outlet opening 54o; the outer peripheral surface 55o; the inner peripheral surface 55i; a plurality of the first air flow paths 56; and a plurality of the second air flow paths 57. In the present embodiment, among the plurality of first air flow paths 56, the outlets 56o of some of the first air flow paths 56 face only the first acoustic space Ssa of the first acoustic damper 61a of the plurality of acoustic dampers 61a and 61b, and do not face the second acoustic space Ssb of the second acoustic damper 61b. In addition, among the plurality of first air flow paths 56, the outlets 56o of the other first air flow paths 56 face only the second acoustic space Ssb of the second acoustic damper 61b of the plurality of acoustic dampers 61a and 61b, and do not face the first acoustic space Ssa of the first acoustic damper 61a. Therefore, in the present embodiment, the enhanced cooling air Acl in the cooling air space Sa flows into each of the acoustic spaces Ssa and Ssb of the plurality of acoustic dampers 61a and 61b through one of the plurality of first air flow paths 56. In the present embodiment, among the plurality of second air flow paths 57, the outlets 57o of some of the second air flow paths 57 face only the first acoustic space Ssa of the first acoustic damper 61a of the plurality of acoustic dampers 61a and 61b, and do not face the second acoustic space Ssb of the second acoustic damper 61b. In addition, among the plurality of second air flow paths 57, the outlets 57o of the other second air flow paths 57 face only the second acoustic space Ssb of the second acoustic damper 61b of the plurality of acoustic dampers 61a and 61b, and do not face the first acoustic space Ssa of the first acoustic damper 61a. Therefore, in the present embodiment, the compressed air Acom in the outer space So flows into each of the acoustic spaces Ssa and Ssb of the plurality of acoustic dampers 61a and 61b through one of the plurality of second air flow paths 57.

As described above, in the present embodiment, similarly to the second embodiment, the enhanced cooling air Acl that has flowed through the first air flow path 56 and the compressed air Acom that has flowed through the second air flow path 57 flow into the acoustic spaces Ssa and Ssb of the plurality of acoustic dampers 61a and 61b, respectively. The air that has flowed into the first acoustic space Ssa flows out to the combustion space Sc through the first acoustic hole 59a. The air that has flowed into the second acoustic space Ssb flows out to the combustion space Sc through the second acoustic hole 59b. Therefore, also in the present embodiment, similarly to the second embodiment, while the air is allowed to flow out from the acoustic spaces Ssa and Ssb to the combustion space Sc on the inner peripheral side of the pipe 51c, the mass flow rate of the air can be suppressed.

The pipe 51c of the present embodiment does not include the third air flow path 58 in each of the above embodiments. However, the pipe 51c of the present embodiment may include the third air flow path 58.

Fifth Embodiment

Figure 12:
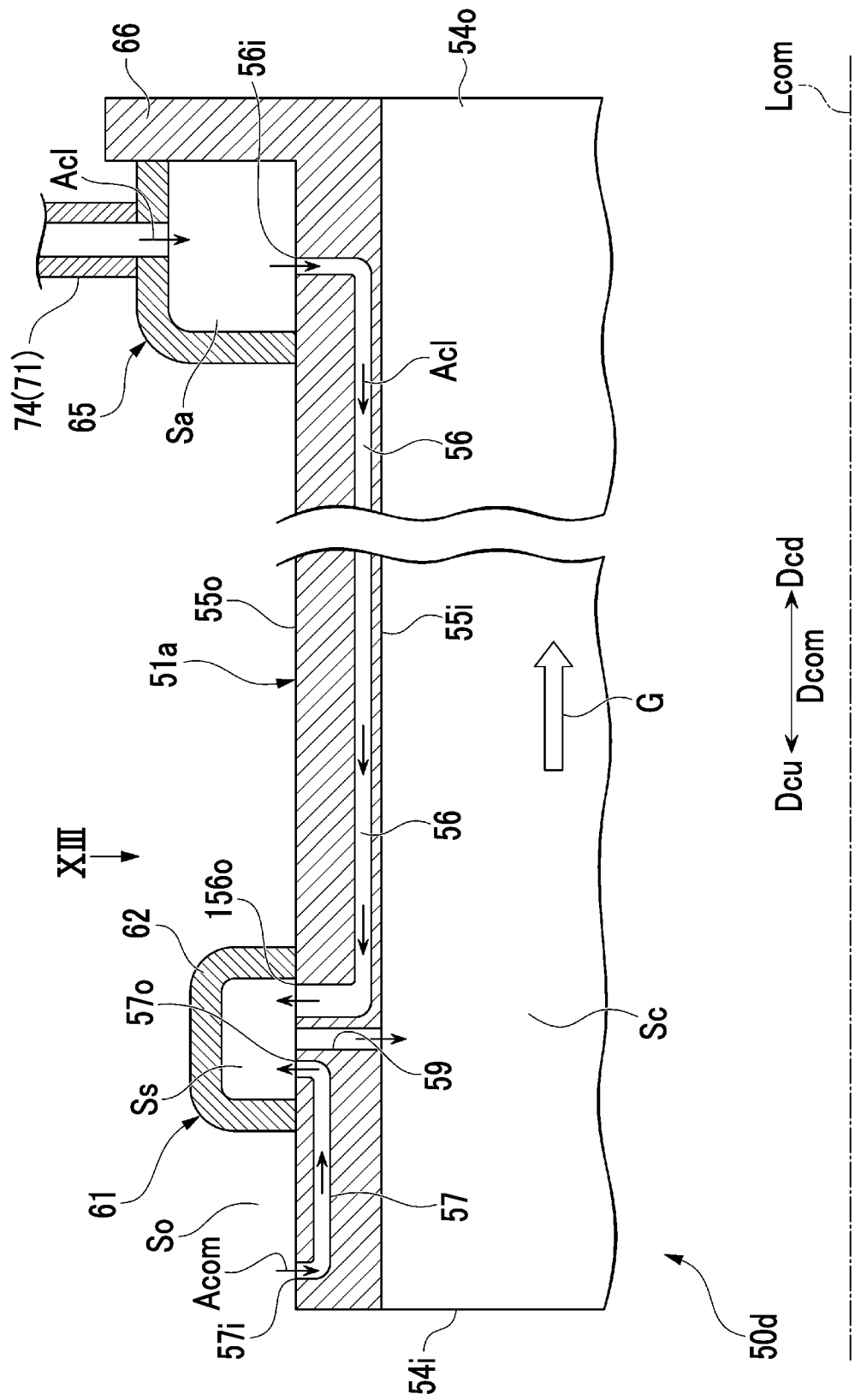
FIG. 12 is a sectional view according to a fifth embodiment of the present invention, which corresponds to FIG. 6.
Figure 13:
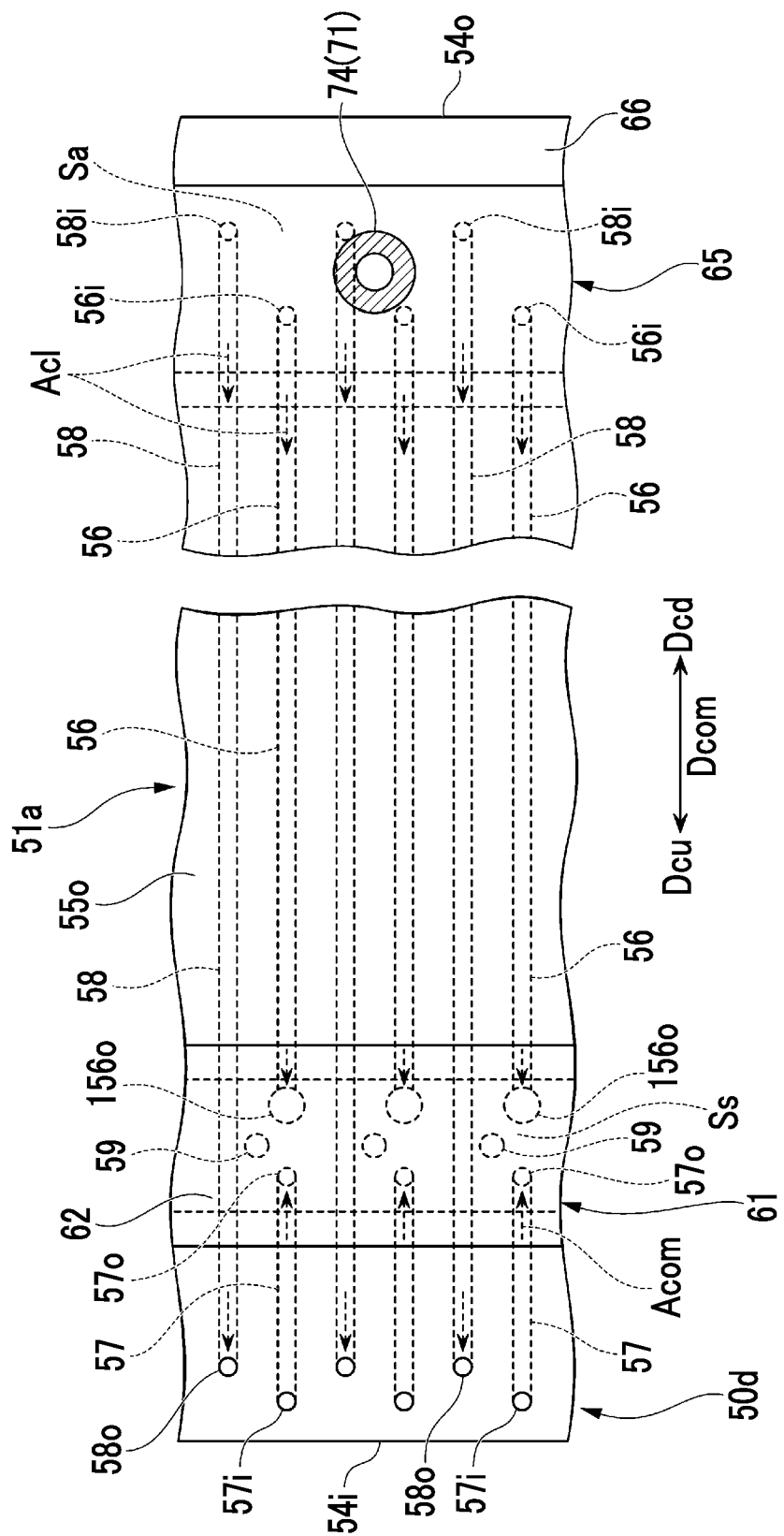
FIG. 13 is a view on an arrow according to the fifth embodiment of the present invention, which corresponds to FIG. 7.

Hereinafter, a fifth embodiment of the gas turbine equipment according to the present invention will be described with reference to FIGS. 12 and 13. The gas turbine equipment of the present embodiment differs from the gas turbine equipment of the second embodiment only in the configuration of the transition piece of the combustor. Therefore, hereinafter, a configuration of a transition piece 50d of the present embodiment will be mainly described.

Similarly to the second embodiment, the transition piece 50d of the present embodiment includes the pipe 51a; the acoustic damper 61; the cooling air jacket 65; and the attachment flange 66. Similarly to the pipe 51a of the second embodiment, the pipe 51a includes the inlet opening 54i; the outlet opening 54o; the outer peripheral surface 55o; the inner peripheral surface 55i; a plurality of the first air flow paths 56; and a plurality of the third air flow paths 58. The pipe 51a of the present embodiment further includes a plurality of the second air flow paths 57. The pipe 51a of the present embodiment includes the third air flow path 58, but may not include the third air flow path 58.

Also in the present embodiment, similarly to the second embodiment, the enhanced cooling air Acl in the cooling air space Sa flows into the first air flow path 56 and the third air flow path 58 of the pipe 51a, and flows through the air flow paths 56 and 58. The enhanced cooling air Acl is heated while cooling the pipe 51a because of heat exchange with the pipe 51a, which is exposed to the high-temperature combustion gas G, in the process of flowing through the air flow paths 56 and 58. The enhanced cooling air Acl that has passed through the third air flow path 58 flows out to the outer space So from the outlet 58o of the third air flow path 58, and is mixed with the compressed air Acom present in the outer space So. In addition, the enhanced cooling air Acl that has passed through the first air flow path 56 flows from an outlet 156o of the first air flow path 56 into the acoustic space Ss.

The compressed air Acom in the outer space So flows into the second air flow path 57 from the inlet 57i of the second air flow path 57 to flow through the second air flow path 57. The compressed air Acom is heated while cooling the pipe 51a because of heat exchange with the pipe 51a, which is exposed to the combustion gas G, in the process of flowing through the second air flow path 57. The compressed air Acom that has passed through the second air flow path 57 flows from the outlet 57o of the second air flow path 57 into the acoustic space Ss.

Therefore, in the present embodiment, the enhanced cooling air Acl that has flowed through the first air flow path 56 and the compressed air Acom that has flowed through the second air flow path 57 flows into the acoustic space Ss from the outlet 156o and the outlet 57o, respectively. The air that has flowed into the acoustic space Ss flows out to the combustion space Sc through the acoustic hole 59. As described above, in the present embodiment, similarly to the first embodiment, since the air flowing out from the acoustic space Ss to the combustion space Sc through the acoustic hole 59 includes the enhanced cooling air Acl that has flowed through the first air flow path 56, the air having a large amount of heating of the air is capable of flowing out to the combustion space Sc. Therefore, also in the present embodiment, similarly to the second embodiment, while the air is allowed to flow out from the acoustic space Ss to the combustion space Sc, the mass flow rate of the air can be suppressed.

In the second embodiment described above, the case has been depicted in which the opening area of the outlet 56o and the opening area of the outlet 57o are the same; however, in the present embodiment, the opening area of the outlet 156o that guides the enhanced cooling air Acl, which has passed through the first air flow path 56, into the acoustic space Ss is larger than the opening area of the outlet 57o that guides the compressed air Acom, which has passed through the second air flow path 57, into the acoustic space Ss. For this reason, in the present embodiment, the flow velocity of the enhanced cooling air Acl flowing from the outlet 156o into the acoustic space Ss can be made lower than the flow velocity of the enhanced cooling air Acl flowing from the outlet 56o into the acoustic space Ss in the second embodiment. Accordingly, since a reduction in static pressure in the acoustic space Ss due to the inflow of the enhanced cooling air Acl can be suppressed, the combustion gas G in the combustion space Sc can be more suppressed from flowing into the acoustic space Ss through the acoustic hole 59 than in the second embodiment. In addition, in the present embodiment, since the opening area of the outlet 156o of the first air flow path 56 allowing a larger mass flow rate than the second air flow path 57 is large, a reduction in static pressure in the acoustic space Ss can be efficiently suppressed.

Modification Example of Fifth Embodiment

Figure 14:
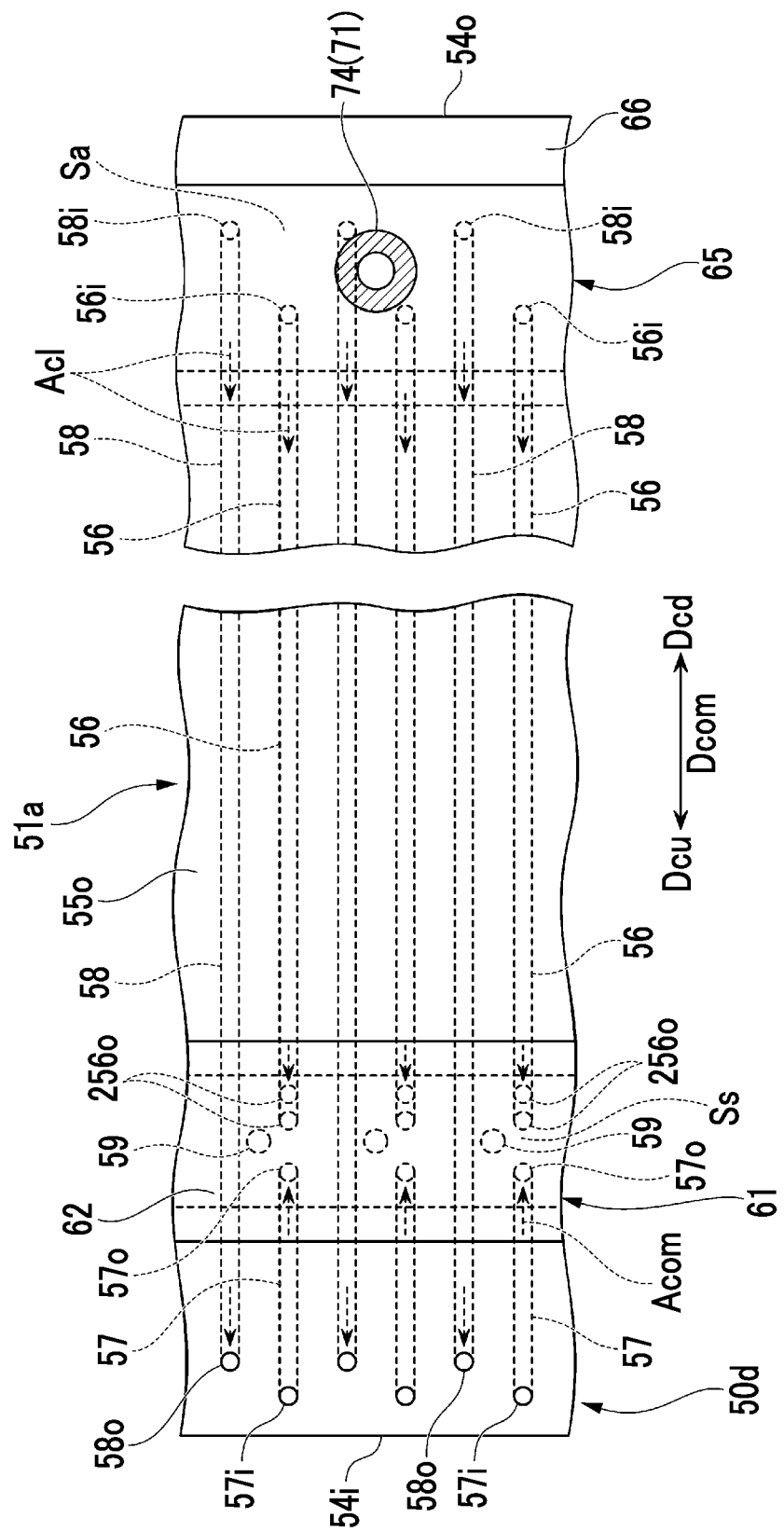
FIG. 14 is a view on an arrow in a modification example of the fifth embodiment according to the present invention, which corresponds to FIG. 13.

In the fifth embodiment described above, the case has been depicted in which the outlet 156o having a larger opening area than that of the outlet 57o is formed in the pipe 51. In other words, in the fifth embodiment, the case has been described in which one outlet 156o is provided in one first air flow path 56. However, as illustrated in FIG. 14, a plurality of (for example, two) outlets 256o facing the acoustic space Ss may be provided in one first air flow path 56. The total opening area of the plurality of outlets 256o provided in one first air flow path 56 is larger than the opening area of one outlet 57o. Also in such a modification example of the fifth embodiment, similarly to the fifth embodiment, the combustion gas G can be suppressed from flowing into the acoustic space Ss by reducing the flow velocity of the enhanced cooling air Acl flowing into the acoustic space Ss.

In addition, instead of the outlet 56o of the third and fourth embodiments, the outlet 156o of the fifth embodiment or the outlets 256o of the modification example of the fifth embodiment may be provided.

INDUSTRIAL APPLICABILITY

According to one aspect of the present invention, while the air is allowed to flow out from the acoustic space of the acoustic damper to the space on the inner peripheral side of the pipe, the mass flow rate of the air can be suppressed.

REFERENCE SIGNS LIST

10: Gas turbine
11: Gas turbine rotor
15: Gas turbine casing

16: Intermediate casing
20: Compressor
21: Compressor rotor
22: Rotor shaft
23: Rotor blade row
25: Compressor casing
26: Stator vane row
30: Turbine
31: Turbine rotor
32: Rotor shaft
33: Rotor blade row
35: Turbine casing
36: Stator vane row
40: Combustor
41: Fuel nozzle
42: Burner
43: Frame
45: Fuel line
46: Fuel flow rate-regulating valve
50, 50a, 50b, 50c, 50d: Transition piece (or combustion pipe)
51, 51a, 51b, 51c: Pipe
52i: Inner peripheral wall panel
52o: Outer peripheral wall panel
53: Groove
54i: Inlet opening
54o: Outlet opening
55i: Inner peripheral surface
55o: Outer peripheral surface
56: First air flow path
56i: Inlet
56o, 156o, 256o: Outlet
57: Second air flow path
57i: Inlet
57o: Outlet
58: Third air flow path
58i: Inlet
58o: Outlet
59: Acoustic hole
59a: First acoustic hole
59b: Second acoustic hole
61: Acoustic damper
61a: First acoustic damper
61b: Second acoustic damper
62: Acoustic cover
65: Cooling air jacket
66: Attachment flange
70: Cooling device
71: Cooling air line
72: Air bleeding line
73: Cooling air main line
74: Cooling air branch line
75: Cooler
76: Boost compressor
A: Air
Acom: Compressed air
Acl: Enhanced cooling air
G: Combustion gas
Lcom: Combustor axis (or simply axis)
Lr: Rotor axis
Da: Rotor axial direction
Dau: Axial upstream side
Dad: Axial downstream side
Dc: Circumferential direction
Dr: Radial direction
Dri: Radial inner side
Dro: Radial outer side
Dcom: Combustor axial direction (or simply axial direction)
Dcu: Combustor upstream side (or simply upstream side)
Dcd: Combustor downstream side (or simply downstream side)
Sc: Combustion space
Ss: Acoustic space
Ssa: First acoustic space
Ssb: Second acoustic space
Sa: Cooling air space
So: Outer space

The invention claimed is:

1. A transition piece comprising:
   a pipe which has a tubular shape around an axis for combustion of fuel on an inner peripheral side of the pipe;
   an acoustic damper including a first part of a panel defining the pipe, and an acoustic cover defining an acoustic space on an outer peripheral side of the pipe together with the first part of the panel; and
   a cooling air jacket defining a cooling air space together with a second part of the panel other than the first part of the panel, the cooling air space being isolated from an outer space on the outer peripheral side of the pipe, the cooling air jacket being configured to be supplied with air having a higher pressure and a lower temperature than air in the outer space,
   wherein the pipe includes:
   an inlet opening defined at a first end on an upstream side in an axial direction in which the axis extends;
   an outlet opening defined at a second end on a downstream side in the axial direction;
   an outer peripheral surface facing the outer peripheral side of the pipe;
   an inner peripheral surface facing the inner peripheral side of the pipe;
   a first air flow path defined between the outer peripheral surface and the inner peripheral surface;
   a second air flow path defined between the outer peripheral surface and the inner peripheral surface; and
   an acoustic hole penetrating through the pipe from the acoustic space to a combustion space on the inner peripheral side of the pipe,
   wherein:
   the cooling air jacket is on the downstream side of the acoustic cover;
   the first air flow path includes a first inlet facing the cooling air space and being configured to guide the air in the cooling air space into the first air flow path, and a first outlet facing the acoustic space and being configured to guide the air, which has passed through the first air flow path, into the acoustic space;
   the second air flow path includes a second inlet facing the outer space and being configured to guide the air in the outer space into the second air flow path, and a second outlet facing the acoustic space and being configured to guide the air, which has passed through the second air flow path, into the acoustic space;
   the second inlet is on the upstream side of the acoustic cover; and
   the first outlet is spaced apart from the second outlet.

2. The transition piece according to claim 1, further comprising:
   an attachment flange extending from the outer peripheral surface of the pipe to the outer peripheral side of the pipe at the second end on the downstream side of the pipe, wherein the cooling air jacket is in contact with the attachment flange.

3. The transition piece according to claim 1, wherein:

the pipe further includes a third air flow path defined between the outer peripheral surface and the inner peripheral surface; and the third air flow path includes a third inlet facing the cooling air space and being configured to guide the air in the cooling air space into the third air flow path, and a third outlet facing the outer space and being configured to guide the air, which has passed through the third air flow path, into the outer space.

4. The transition piece according to Claim 1, wherein an opening area of the first outlet is larger than an opening area of the second outlet.

5. A combustor comprising:

the transition piece according to claim 1; and a burner configured to inject fuel and air into the combustion space.

6. A gas turbine comprising:

the combustor according to claim 5;

a compressor;

a turbine; and an intermediate casing, wherein:

the compressor includes a compressor rotor configured to rotate around a rotor axis, and a compressor casing covering the compressor rotor;

the turbine includes a turbine rotor configured to rotate integrally with the compressor rotor around the rotor axis, and a turbine casing covering the turbine rotor;

the intermediate casing (i) is between the compressor casing and the turbine casing in a rotor axial direction in which the rotor axis extends; (ii) connects the compressor casing and the turbine casing; and (iii) is configured to receive compressed air that has been discharged from the compressor; and the combustor is in the intermediate casing.

7. Gas turbine equipment comprising:

the gas turbine according to claim 6;

a cooling air line configured to guide the compressed air in the intermediate casing to an outside of the intermediate casing, and then into the cooling air jacket;

a cooler in the cooling air line, the cooler being configured to cool the compressed air passing through the cooling air line; and a boost compressor in the cooling air line, the boost compressor being configured to boost the compressed air that has been cooled by the cooler.

* * * * *